United States Patent
Boss et al.

(10) Patent No.: US 6,329,984 B1
(45) Date of Patent: *Dec. 11, 2001

(54) USER INPUT ROUTING WITH REMOTE CONTROL APPLICATION SHARING

(75) Inventors: Dale W. Boss, Beaverton; David G. Hicks, Hillsboro, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/976,443

(22) Filed: Nov. 26, 1997

Related U.S. Application Data

(63) Continuation of application No. 08/846,680, filed on Apr. 30, 1997, now Pat. No. 5,758,110, which is a continuation of application No. 08/631,037, filed on Apr. 12, 1996, now abandoned, which is a continuation of application No. 08/261,740, filed on Jun. 17, 1994, now abandoned.

(51) Int. Cl.[7] ................................................... G06F 15/16
(52) U.S. Cl. .......................................... 345/329; 345/302
(58) Field of Search ................................... 345/302, 329, 345/330, 331, 332, 339, 340; 395/200.31, 200.34, 200.35

(56) References Cited

U.S. PATENT DOCUMENTS

| 554,300 | 8/1996 | Skarbo et al. ........................ 345/332 |
|---|---|---|
| 4,974,173 | * 11/1990 | Stefik et al. ........................ 345/331 |
| 5,008,853 | * 4/1991 | Bly et al. ........................... 345/331 |
| 5,107,443 | * 4/1992 | Smith et al. ........................ 345/331 |
| 5,220,657 | * 6/1993 | Bly et al. ........................... 711/154 |
| 5,241,625 | 8/1993 | Epard et al. ........................ 345/502 |
| 5,353,398 | 10/1994 | Kitahaea et al. .................... 345/332 |
| 5,379,374 | * 1/1995 | Ishizaki et al. ..................... 345/331 |
| 5,392,400 | * 2/1995 | Berkowitz et al. ............. 395/200.33 |
| 5,608,872 | 3/1997 | Schwartz et al. .................... 709/205 |
| 5,717,856 | * 2/1998 | Carleton ............................. 709/205 |
| 5,745,711 | * 4/1998 | Kitahara et al. .................... 345/330 |

FOREIGN PATENT DOCUMENTS

WO 93 08522 A   4/1993 (WO).

OTHER PUBLICATIONS

Programmer's Reference vol. 1: Overview Microsoft Windows Software Development Kit, Microsoft Corporation, 1992, pp. 28, 71–72 and 79.

Ishii, "Team Workstation: Towards a Seamless Shared Workspace," In Proceedings of CSCW '90, Los Angeles, Oct. 1990, pp. 13–26.

(List continued on next page.)

*Primary Examiner*—Stephen S. Hong
(74) *Attorney, Agent, or Firm*—Blakely, Sokoloff, Taylor & Zafman LLP

(57) ABSTRACT

A method for sharing control of a shared application with a client user. The method comprising transmitting a mouse capture indication to a client system if a host system detects a mouse capture event for the shared application, and transmitting a mouse release capture indication to the client system if the host system detects a mouse release event for the shared application.

20 Claims, 29 Drawing Sheets

OTHER PUBLICATIONS

Ohmori et al. "Distributed Cooperative Control for Sharing Application Based on Multiparty and Multimedia Desktop Conferencing System: MERMAID," Proceedings of the 12th International Conference on Distributed Computing Systems, Jun. 1992, pp. 538–546.

IBM Technical Disclosure Bulletin, vol. 36, No. 6A, Jun. 1993, Armonk, NY, US, pp. 471–472, XP000373062, "Mechanism and User Interface for Remote Mirroring of Application Windows"*whole document*.

IBM Technical Disclosure Bulletin, vol. 36, No. 6A, Jun. 1993, Armonk, NY, US, pp. 407–410, XP000372474 "Overlay Mechanism for Annotating Sharing and Remote Window–Control"*whole document*.

* cited by examiner

USER INPUT ROUTING WITH REMOTE CONTROL APPLICATION SHARING

This is a Continuation Application of application Ser. No. 08/846,680, filed Apr. 30, 1997, now U.S. Pat. No. 5,758, 110, which is a Continuation of application Ser. No. 08/631, 037 filed Apr. 12, 1996 now abandoned, which is a Continuation of application Ser. No. 08/261,740 filed Jun. 17, 1994 now abandoned.

BACKGROUND OF THE INVENTION

1. Field of the Invention

The invention relates to computer systems implementing a graphic user interface (GUI). More particularly, the invention relates to task-based application sharing in a graphic user interface such as Windows®.

2. Art Background

With the present day heavy reliance on personal computers at work and at home, a method for allowing a user to share control of one personal computer with a user of another personal computer located at a remote area is desirable.

One method of enabling one user to control a remote user's personal computer is through a "traditional" remote control method. In a traditional remote control method, a personal computer of a local user, referred to as the client system, is connected to a personal computer of a remote user, referred to as the host system. The user of the client system, referred to as the client user, takes control of the host system. The mouse and keyboard actions of the client user are then directly transmitted to the host system. The normal screen displayed on the client system is replaced with an image of the display screen of the host system.

A disadvantage of the traditional remote control method is that the traditional remote control method does not allow for both the user of the host system, referred to as the host user, and the client user to use their personal computers at the same time. Instead, while the client user is given complete control of the host system, the host user inputs are either rejected by the host system or are accepted but lead to unpredictable results. In addition, the client user is able to see the entire host screen, and hence the host user is deprived of his/her privacy with matters displayed on his/her host screen.

A different type of a remote control method (referred to herein as the "rectangle method") allows for the host user to define a rectangle on the host system. A client user can see and act upon only the particular area defined by the rectangle on the host system. This method allows for the host user to act upon the area surrounding the rectangle on the host system screen, while the prior described traditional remote control method does not allow the host user to act upon the host system.

A disadvantage of the rectangle method is that the shared area within the rectangle is arbitrarily chosen by the host user and any subsequent movement or resizing of a window of a shared application may lead to unpredictable results. In addition, the host user has no feedback as to the selected area within which the client user may have control. Instead the personal computer screen of the host user appears as a normal screen without any rectangular demarcation to indicate the area within which the client user may have control.

Typically, users of remote control methods desire to share one or more applications on the host user's host system screen regardless of the size and/or positioning of the applications being shared. The above described remote control methods prevent any movement or resizing of a shared application. FIGS 1a and 1b illustrate two prior art methods which attempt to allow remote control of one user of a personal computer (PC) referred to as a client system, over another user's PC referred to as a host system.

FIG. 1a illustrates the traditional remote control method. In the traditional remote control method, normal screen 12 of client system 11 is replaced with the exact image of host screen 13. The client user takes control of host system 14 and the client's mouse and keyboard actions are transmitted to host system 14. While the client user has control over host system 14, the host user is either unable to make any inputs to host system 14 or, if inputs are accepted by host system 14, such inputs may lead to unpredictable results.

FIG. 1b illustrates a rectangle remote control method. In a "rectangle method" a rectangle 15 on host display screen 13 is defined. Anything within rectangle 15 may be seen by the client user through a corresponding rectangle 16 on client system 11 and may be controlled by the client user. However, the size and position of rectangle 15 is arbitrary and unchanging, and any movement or resizing of an application or a pop-up window within rectangle 15 may lead to unpredictable results.

A method overcoming the disadvantages of the above-described remote control methods which also allows both the host user and the client user to share control of one or more applications that the host user has chosen to share on the host system is desirable.

BRIEF SUMMARY OF THE INVENTION

The invention provides methods and apparatus for task based application sharing in a graphic user interface such as Windows®. A user, referred to as the host user, designates an application to be shared, referred to as a shared application. Another user at a remote location, referred to as the client user, shares control of the shared application. The shared application runs on and executes only on the host system.

The client system has a rectangular area on the display screen within which all shared applications are displayed. Further, the client user can see the windows of a shared application and controls the shared application by performing mouse and keyboard movements with the client keyboard and mouse. Because the shared application is running on the host system, all client mouse and keyboard movements are first transmitted to the host system and actually executed on the host system.

The features of the task based application sharing method of the present invention include restricting display driver features, shared fonts feature, detecting children of a shared task feature, automatic resizing of remotely shared rectangle feature, detecting shared area covered by non-shared windows feature, remotely shared rectangle auto-resizing feature, remotely shared rectangle auto-resizing feature, client mouse/keyboard movement transmission feature and cursor display on client display device feature.

In the task based application sharing method of the present invention calls by the display driver on the host system are intercepted and the identification of the currently running task is examined. If the currently running task is part of a shared application, the task, which is a display driver call, is transmitted to the client system. Further, operations are monitored, and changes in a window of a shared application are transmitted to the client system as display information. The display information is then utilized by the client system to reproduce any changes in the window as displayed on the host system.

In addition, the task based application method allows the client system to render an image of all windows of a shared application including pop-up dialogs and menus without also displaying unshared applications. Further, method of the present invention allows the client host user to continue performing normal operations outside of the shared rectangular area and allows the host user to define the tasks which are to be shared.

Unlike prior art remote control methods which either render an image of the entire host screen on the client screen display device or a shared rectangular area which does not accommodate movement or resizing of a shared window, the task based application method of the present invention allows flexibility to both the host and the client users.

The present invention includes other features and advantages which will become more fully apparent from the following detailed description taken in conjunction with the accompanying drawings.

DETAILED DESCRIPTION OF THE INVENTION

Apparatus and methods for task based application sharing in a graphic user interface are disclosed in the following description.

Figure 1A:
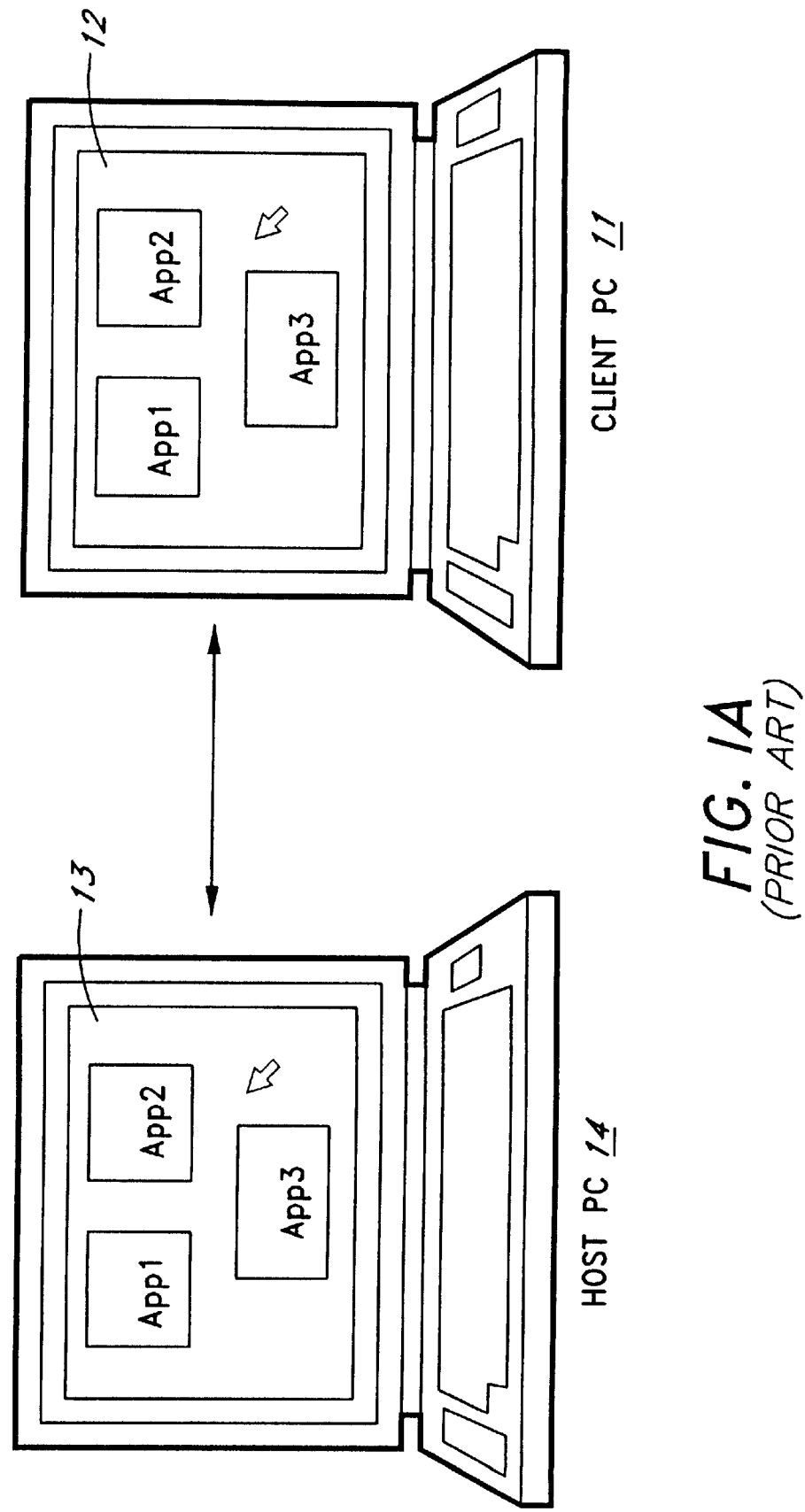
FIGS. 1a and 1b illustrate computer systems illustrating two exemplary prior art remote control methods.
Figure 1B:
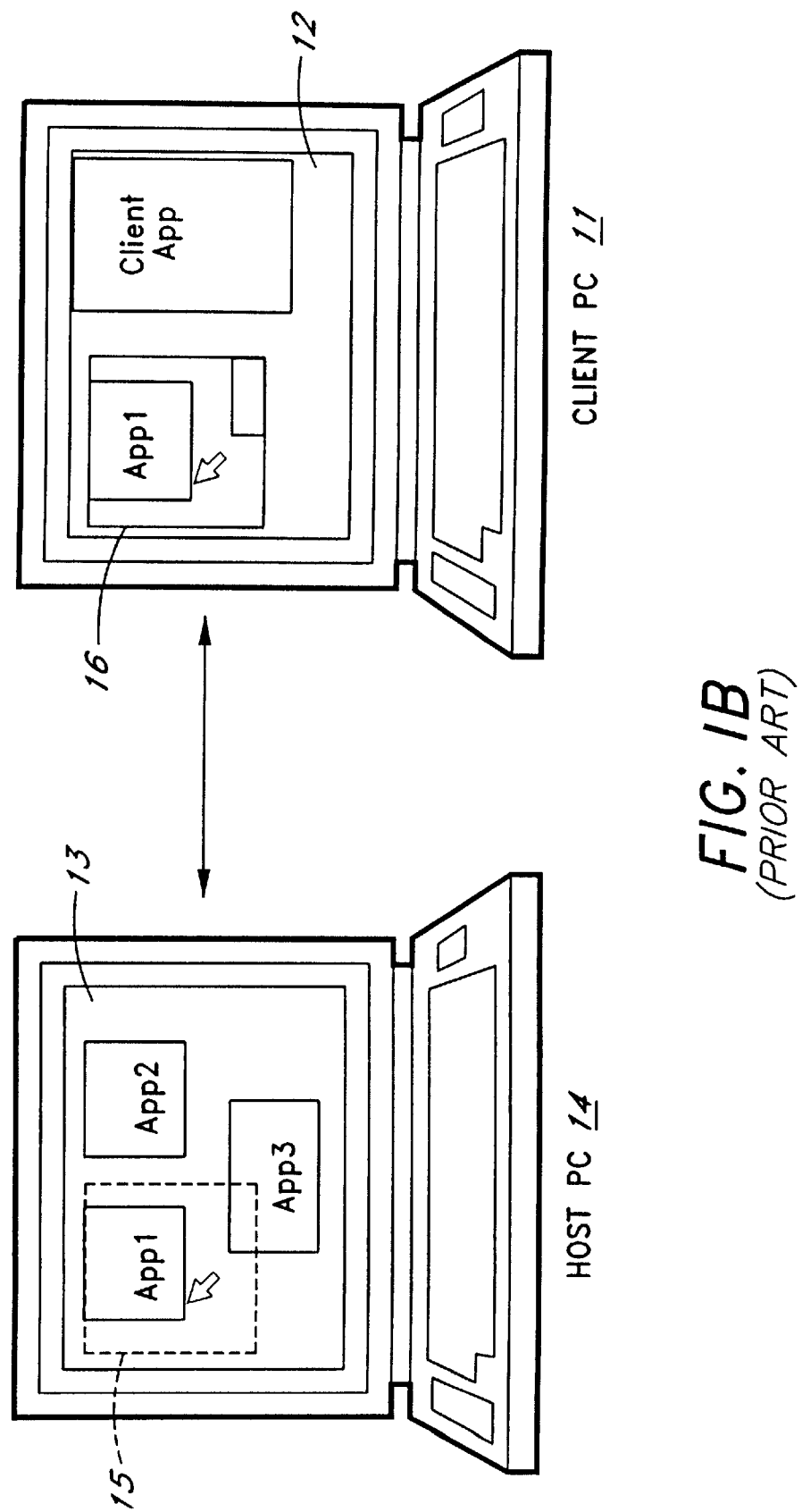
Figure 2:
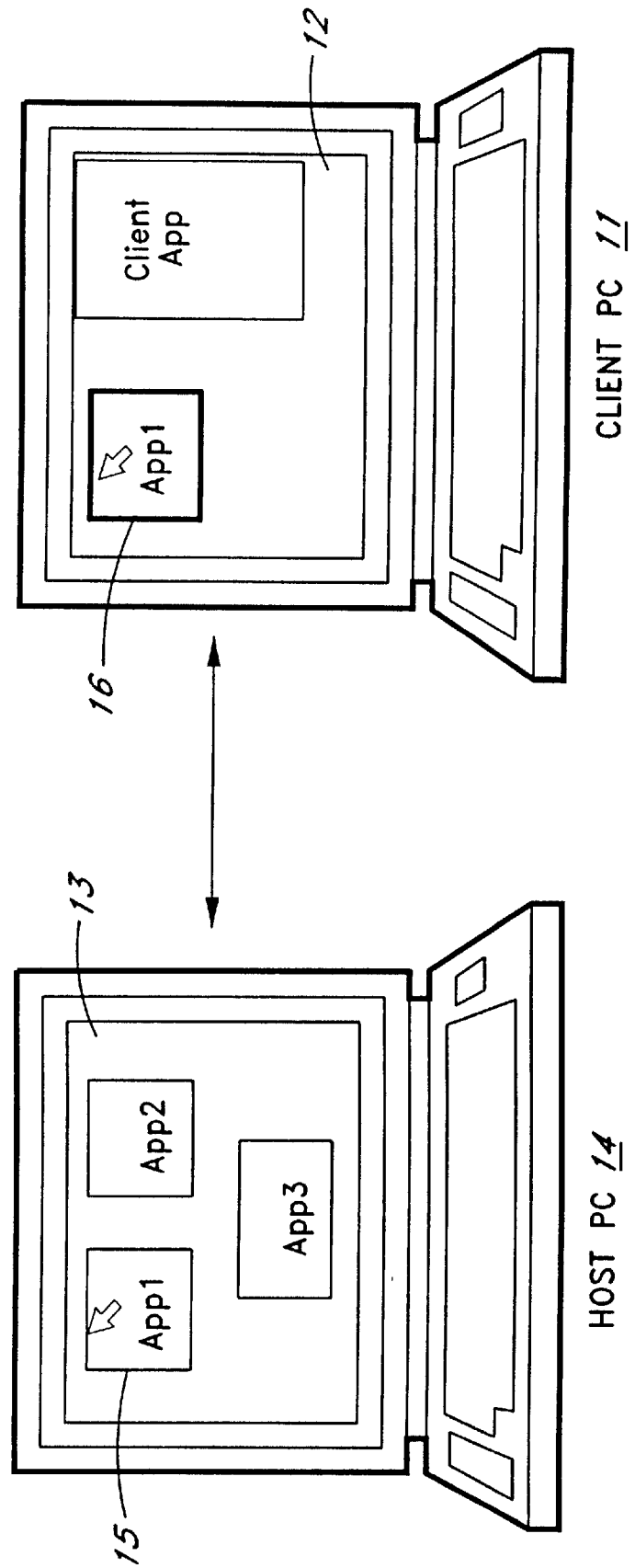
FIG. 2 illustrates two computer systems employing the task based application sharing method of the present invention.

FIG. 2 illustrates the task based application sharing method of the present invention. In the task based application sharing method of the present invention, both the host and the client user share control of host system 14. Further, the host and the client user only share control of one or more applications which the host user has selected to share. These shared applications are displayed within the shared corresponding rectangle 16 on client system 11.

The shared application runs on host system 14. What appears on display screen 12 of client system 11 is a duplicate image of what is displayed on display screen 13 of host system 14. All client mouse and keyboard movements on the shared applications are executed on host system 14 on which the shared application is actually running.

Figure 3:
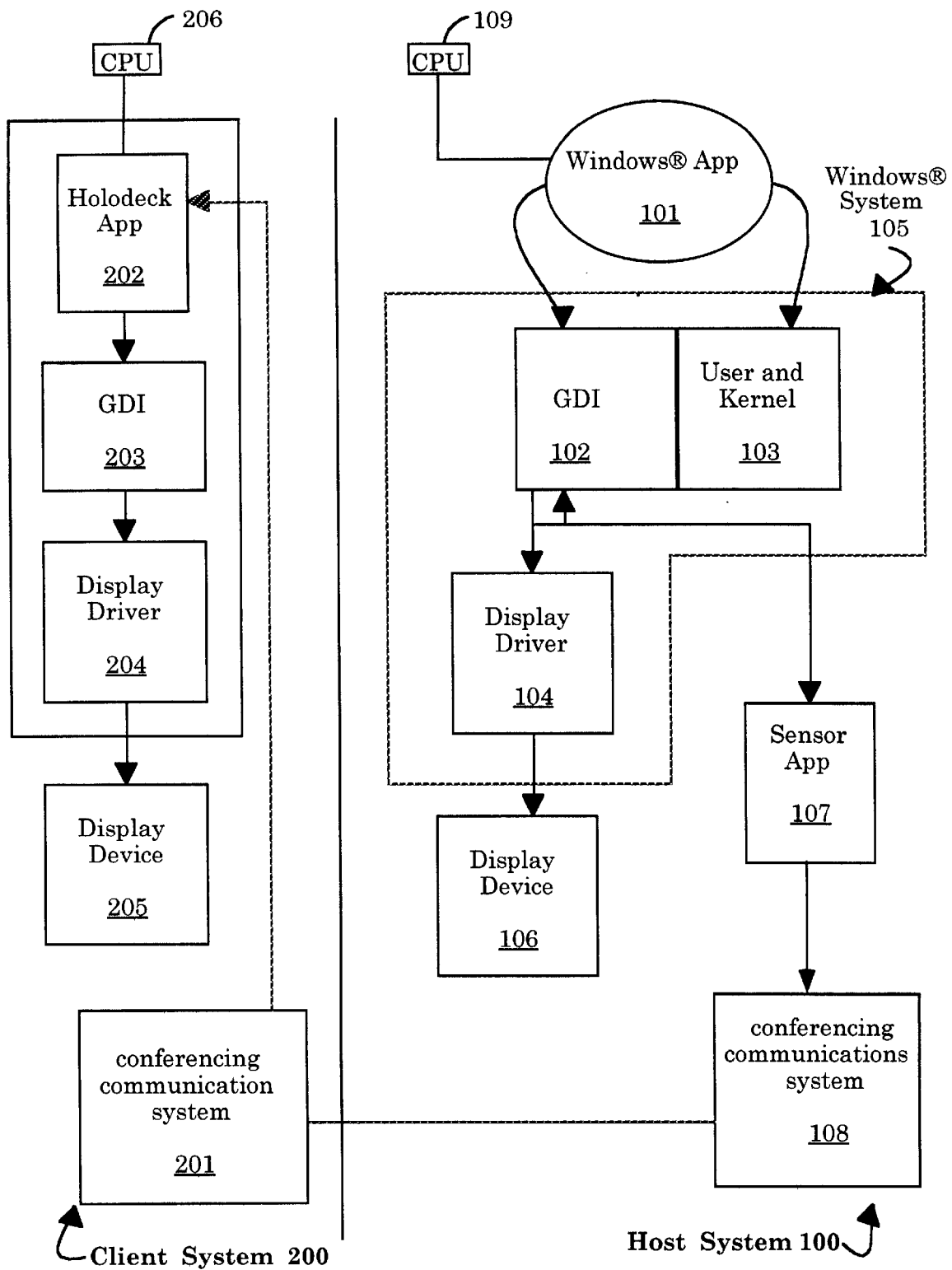
FIG. 3 is a block diagram illustrating the flow of information between the host and the client systems illustrated in FIG. 2.

FIG. 3 is a block diagram illustrating the flow of information from host system 100 to client system 200. CPU 109 drives applications on host system 100. CPU 206 drives applications on client system 200. In host system 100, a normal Windows® application 101 such as Word® is interfaced with graphical device interface (GDI) 102 which is a software providing drawing capabilities To Windows® system 105. Windows® application 101 is also interfaced with user 103. User as referred here does not refer to the human user of a PC but is Windows®' term for a part of the software of Windows® system 105.

When Windows® application 101 calls graphical device interface 102 to perform a drawing, graphical device interface 102 calls display driver 104. Further, display driver 104 performs the prompted drawings on display device 106 of host system 100.

Sensor application 107 detects when graphical device interface 102 makes a call to display driver 104. At every point where graphical device interface 102 makes a call to display driver 104, sensor application 107 inserts a jump instruction from display driver 104 to sensor application 107. All the information necessary for a given display driver to perform prompted line drawings and/or text drawings are retrieved and saved by sensor application 107 for use in the application sharing process between client system 200 and host system 100.

Upon retrieving and saving the necessary information to enable a given display driver to perform the prompted drawings on a display device, sensor application 107 calls display driver 104. Display driver 104 then actually performs the prompted line drawings and/or text drawings on display device 106 of host system 100. Sensor application 107 then formats a communication packet based upon the display information retrieved from graphical device interface 102 regarding the prompted drawings and transmits the communication packet over conferencing communication system 108 which transmits the communication packet to conferencing communication system 201 of client system 200.

The communications packet is received by holodeck application 202 of client system 200, which calls graphical device interface 203. Graphical device interface 203 in turn calls display driver 204. Display driver 204 performs drawings on display device 205 of client system 200 as indicated in the communication package transmitted by sensor application 107 of host system 100.

Figure 4A:
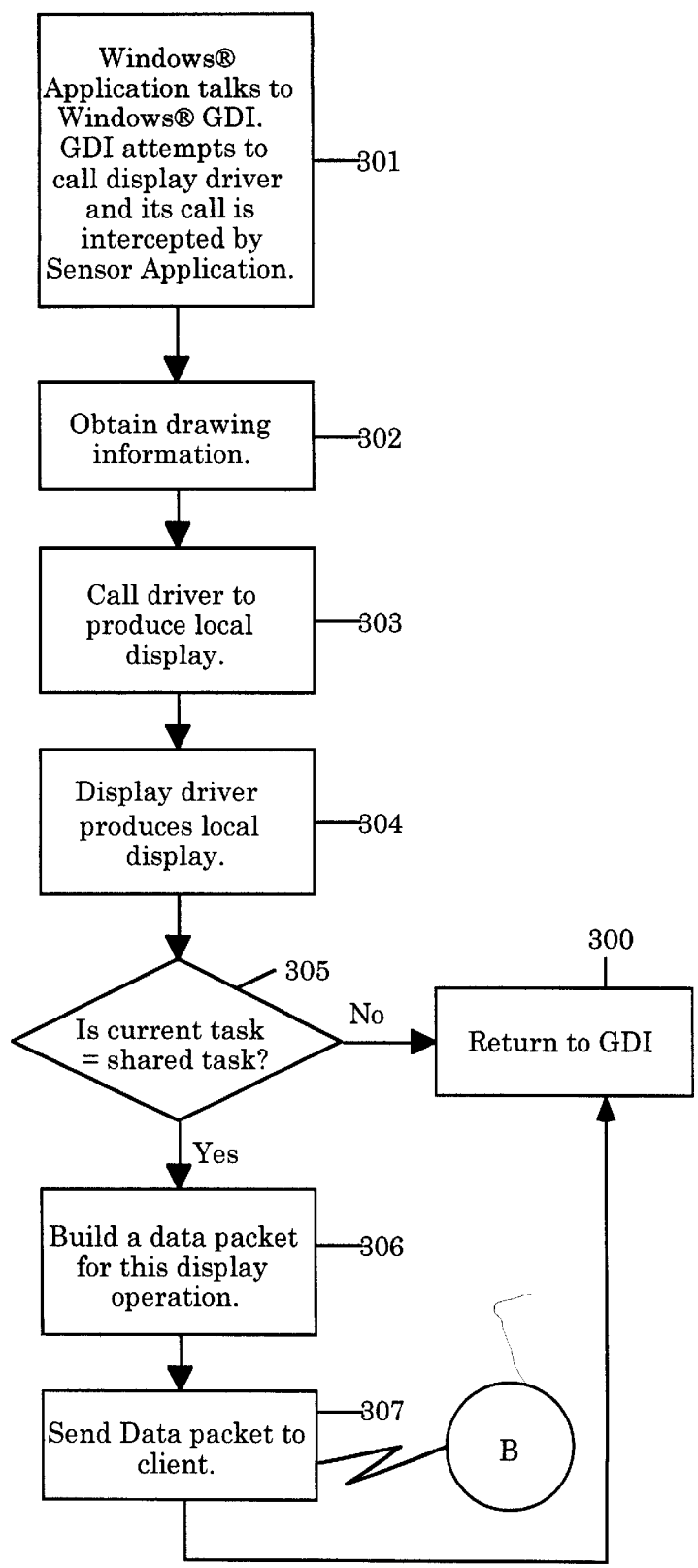
FIGS. 4a and 4b illustrate the task based application sharing method of the present invention.
Figure 4B:
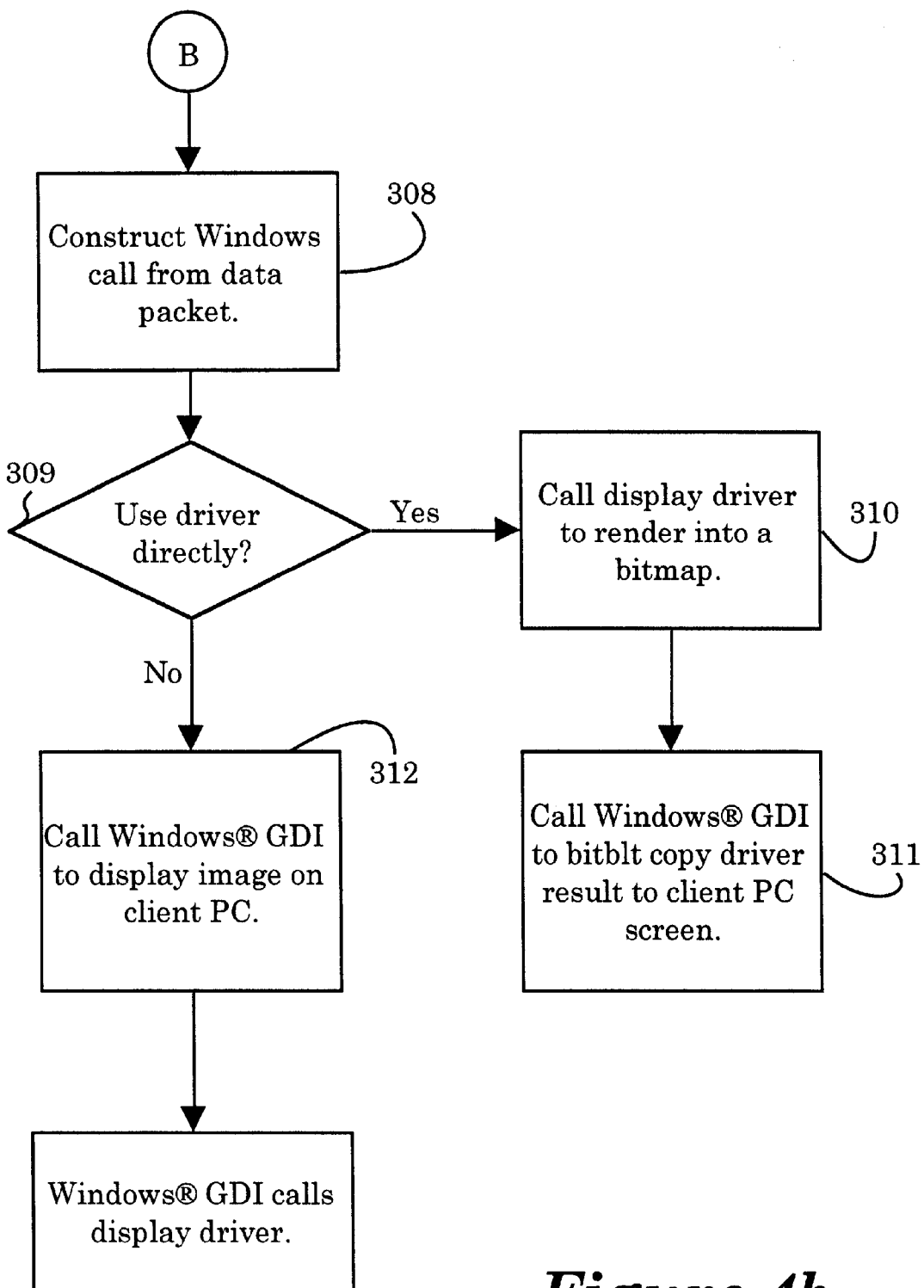

FIGS. 4a and 4b illustrate general flow charts for the task based application sharing method of the present invention. This general flow chart will be described with references being made to the components of FIG. 3.

FIG. 4a illustrates the host side activity. In block 301, Windows® application 101 is interfaced with Windows® graphical device interface 102. In block 302, at every point that Windows® graphical device interface 102 makes a call to display driver 104, sensor application 107 retrieves all of the information necessary for a display driver to perform the prompted drawings.

In block 303, sensor application 107 calls display driver 104. In block 304, display driver 104 produces the local display through display device 106. In block 305, sensor application 107 determines whether or not the current task is part of a shared application. If the current task being performed is not part of the shared application, then in block 300, sensor application 107 continues monitoring graphical device interface 102 for each call graphical device interface 102 makes to display driver 104.

If the current task being performed is part of the shared application, then in block 306, sensor application 107 builds a communication packet for the particular display operation being performed by host system 100. In block 307 this communication packet is transmitted to client system 200 and is accepted by holodeck application 202 of client system 200.

FIG. 4b illustrates the client side activity of the application sharing method of the present invention. In block 308, holodeck application 202 constructs a Windows® call from the communication packet transmitted by host system 100. The Windows® call is used to display the shared task activity being performed on host system 100.

In block 309, if the display task to be performed cannot be performed by graphical device interface 203, then display driver 204 is called in block 310 to render the Windows® call into a bit map. Then in block 311, holodeck application calls graphical device interface 203 to bitblt display driver result to display device 205. Bitblt (bit block transfer) refers to copying section bits from one place to another.

Back in block 309, if graphical device interface 203 of client system 200 is capable of performing the operation prompted and indicated in the communication packet sent by host system 100, graphical device interface 203 calls display river 204. In block 312, display driver 204 performs the operation indicated in the Windows® call constructed in block 308. The Windows® operation executed on host system 200 is thus displayed on client system 100.

FIGS. 5 through 15 illustrate various features of the task based application sharing method of the present invention.

Figure 5A:
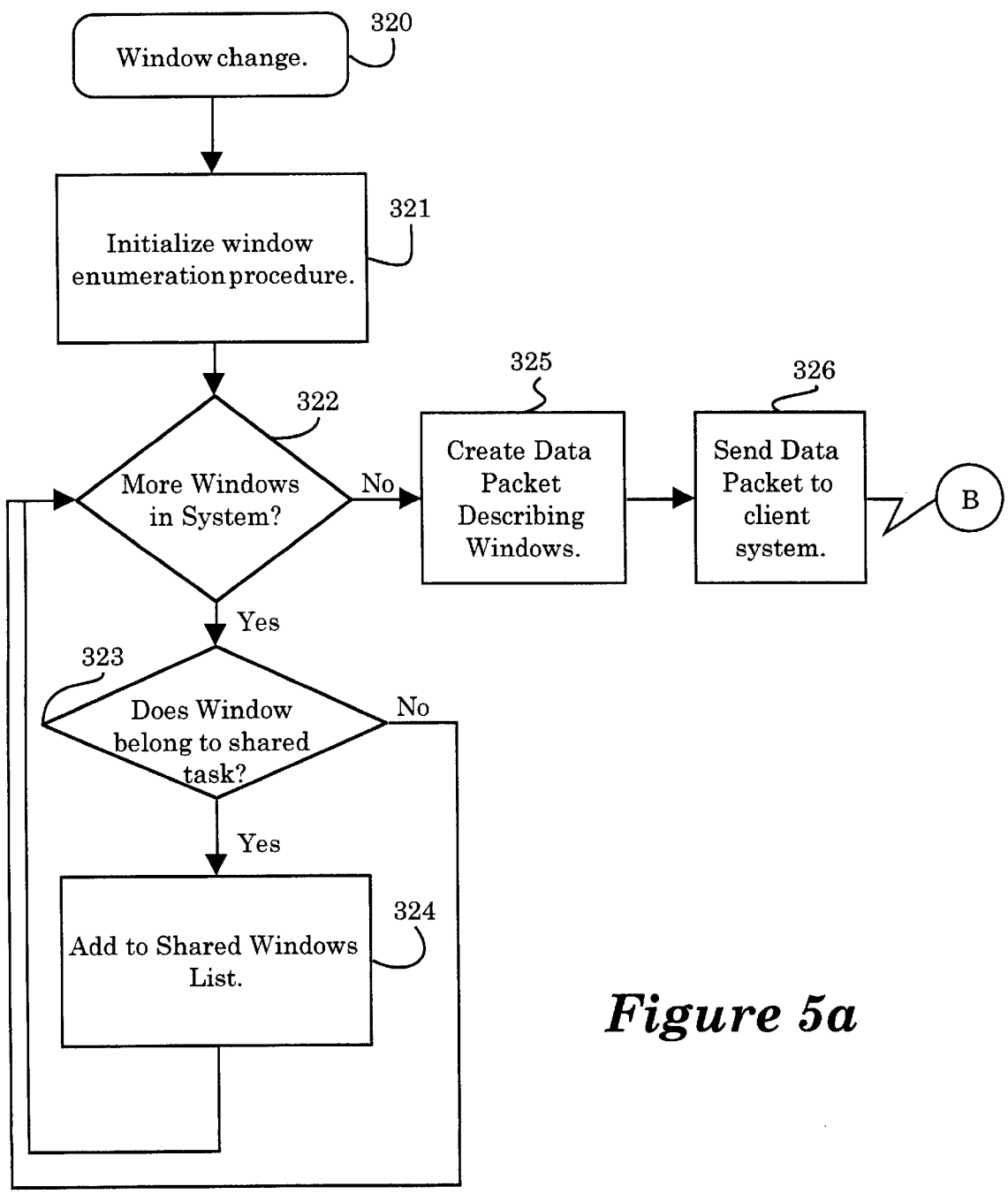
FIGS. 5a and 5b illustrate an automatic resizing feature of the task based application sharing method of the present invention.
Figure 5B:
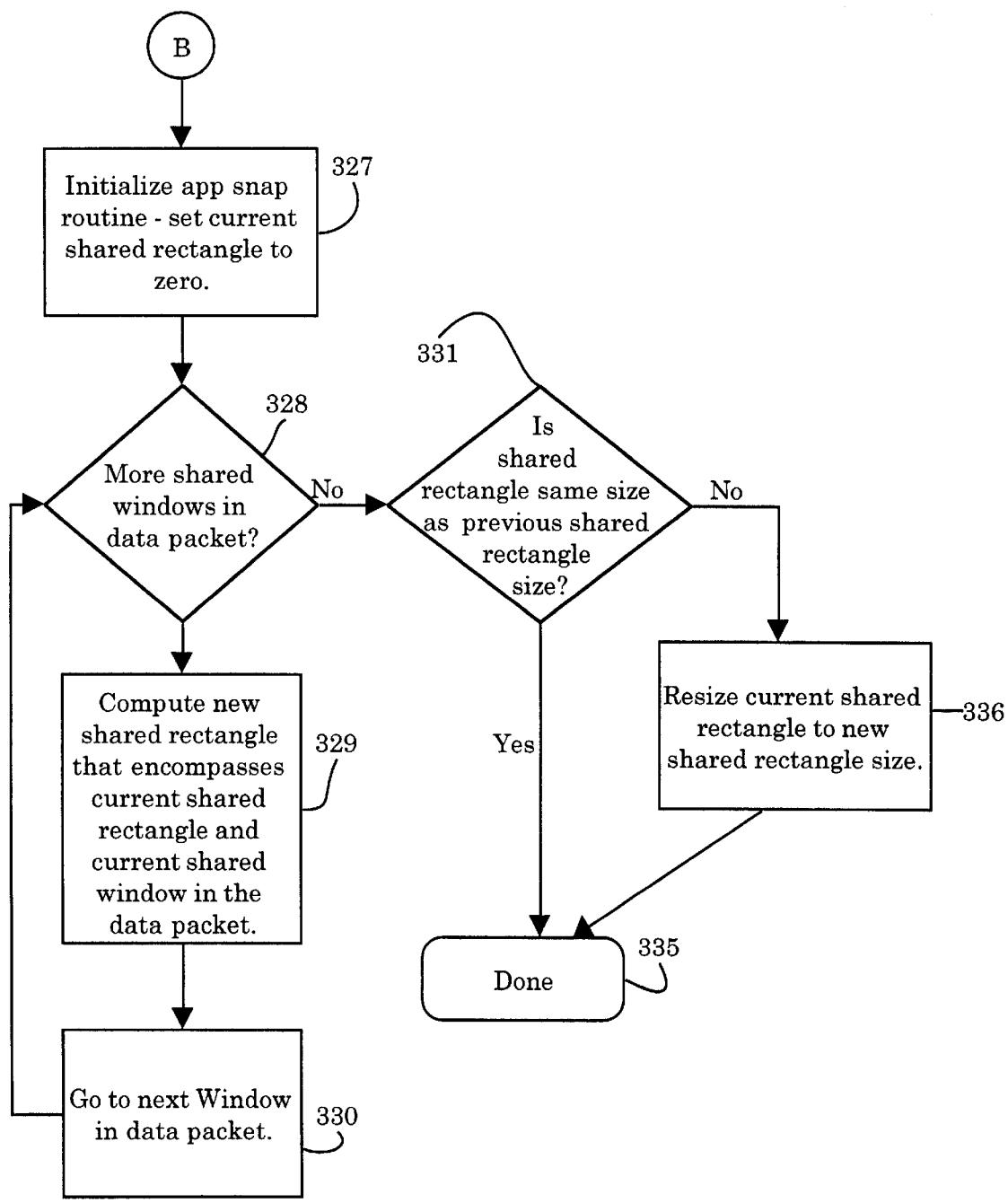

FIGS. 5a and 5b illustrate the automatic resizing feature of the task based application sharing method of the present invention. This feature allows for the automatic resizing of the remotely shared rectangle to current application extensions. All shared applications are displayed within the remotely shared rectangle on the client system. Whenever windows are manipulated in the host system, the current list of windows in the system that belong to the shared tasks are examined. The data thus retrieved is utilized to update the size of the remotely shared rectangle on the client system. Hence, whenever a shared application is resized, minimized, or when a pop-up appears on the host system, the size of the remotely shared rectangle on the client system is updated as well.

In block 320 of FIG. 5a, whenever a window change is detected on the host system, the automatic resizing feature of the present invention is initiated. In block 321, a window enumeration procedure which keeps track of the number of windows being shared is initialized. In block 322, the window enumeration procedure examines the host system to determine if all the windows on the host system have been enumerated. In block 323 each window is examined if it belongs to a shared application. Any window which belongs to the shared application is added to a shared windows list which is a list of all the shared windows belonging to the shared tasks.

If there are no more windows on the host system, and hence the shared windows list is current and updated, then in block 325, a communication packet describing all the shared windows is created from the shared windows list. The communication packet includes the updated window size for each shared window. In block 326, the communication packet is then transmitted to the client system.

The holodeck application of the client system receives the communication packet. An app/snap routine which performs the resizing of the shared rectangle of the client system is initiated in block 327 of FIG. 5b. Further, a shared rectangle variable is set to zero.

In block 328 the communication packet, created from the shared windows list, transmitted by the host system is examined. In blocks 329 and 330, a new remotely shared rectangle is computed for each shared window listed in the communication packet. The new remotely shared rectangle is computed to encompass all shared windows.

Once all additional shared windows in the communication packet are examined and a corresponding new remotely shared rectangle is computed, the new remotely shared rectangle is examined in block 331 and compared to the size of the old remotely shared rectangle. If the new remotely shared rectangle size is the same as the old remotely shared rectangle size, then the current remotely shared rectangle on the client system does not require any resizing. The state then enters block 335 and the automatic resizing feature of the present invention completes its phase. Otherwise if the new remotely shared rectangle size is not equal to the old remotely shared rectangle size, then in block 336, the old remotely shared rectangle is resized to match the size of the new remotely shared rectangle and the automatic resizing of the present invention completes its phase.

Figure 6:
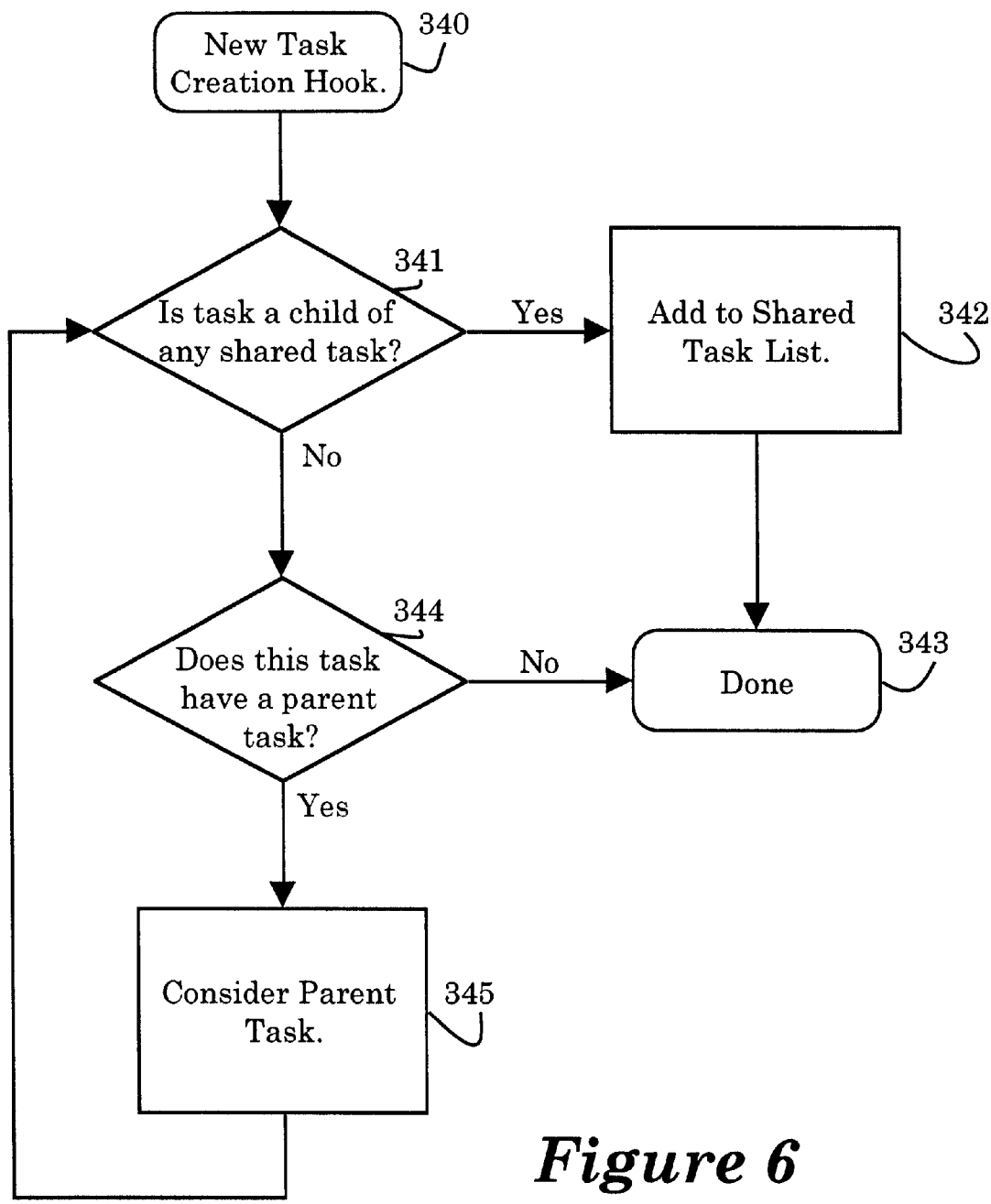
FIG. 6 illustrates an automatic detection and sharing of children of shared tasks feature of the present invention.

FIG. 6 illustrates the automatic detection and sharing of children of shared tasks feature of the present invention. Some Windows® application may start other applications. For example, the Program Manager® is a Windows® application with a primary purpose of starting other applications. A Windows® application selecting a Windows® Help application is another example of a Windows® application starting another application.

The automatic detection and sharing of children of shared tasks feature of the present invention allows the detection of any application, started by a shared Windows® application.

Each time a new task is introduced into the host system, its parent task which is the task which started the new task, is examined. If the parent task is shared, then the new task which is referred to as the child of the parent task, is marked as shared. Any applications running on the host system which are marked as being shared are displayed on the client system in the manner afore-described in the descriptions for FIGS. 4a and 4b. Thus, if a Windows® application such as Word® is shared and Help is selected from the shared Word® application on the host system, the client user will be able to see Help as well on its client system display screen.

FIG. 6 illustrates how the application sharing method of the present invention detects which new tasks/applications running on the host system are shared.

In block 340 of the general flow chart of FIG. 6, sensor application 107 monitors Windows® system 105 to determine if there is any new task created. If there is a new task created, then in block 341 sensor application 107 examines the task to determine whether the task is a child of any shared tasks. In block 342, if the new task created is a child of a shared task then that new task is added to the shared task list. In block 343 the automatic detection and sharing of children of shared tasks feature completes its phase.

Back in block 341, if the new task is not a child of any shared task, then in block 344, the new task is examined to determine whether the new task has a parent task. If the newly created task does not have any parent task then the automatic detection of sharing of children of shared tasks feature of the present invention completes its phase, otherwise the parent task of the newly created task is examined in block 345. If the parent task of the newly created task is a child of the shared task then the parent task and the newly created task is added to the shared task list. Otherwise, the loop from blocks 341 to 345 is repeated until either the task examined is a child of a shared task and hence added to the shared task list or is not a child of a shared task and has no parent task. If the task being examined is not a child of a shared task and has no parent task then there are no newly created tasks to be added to the shared task list.

Figure 7:
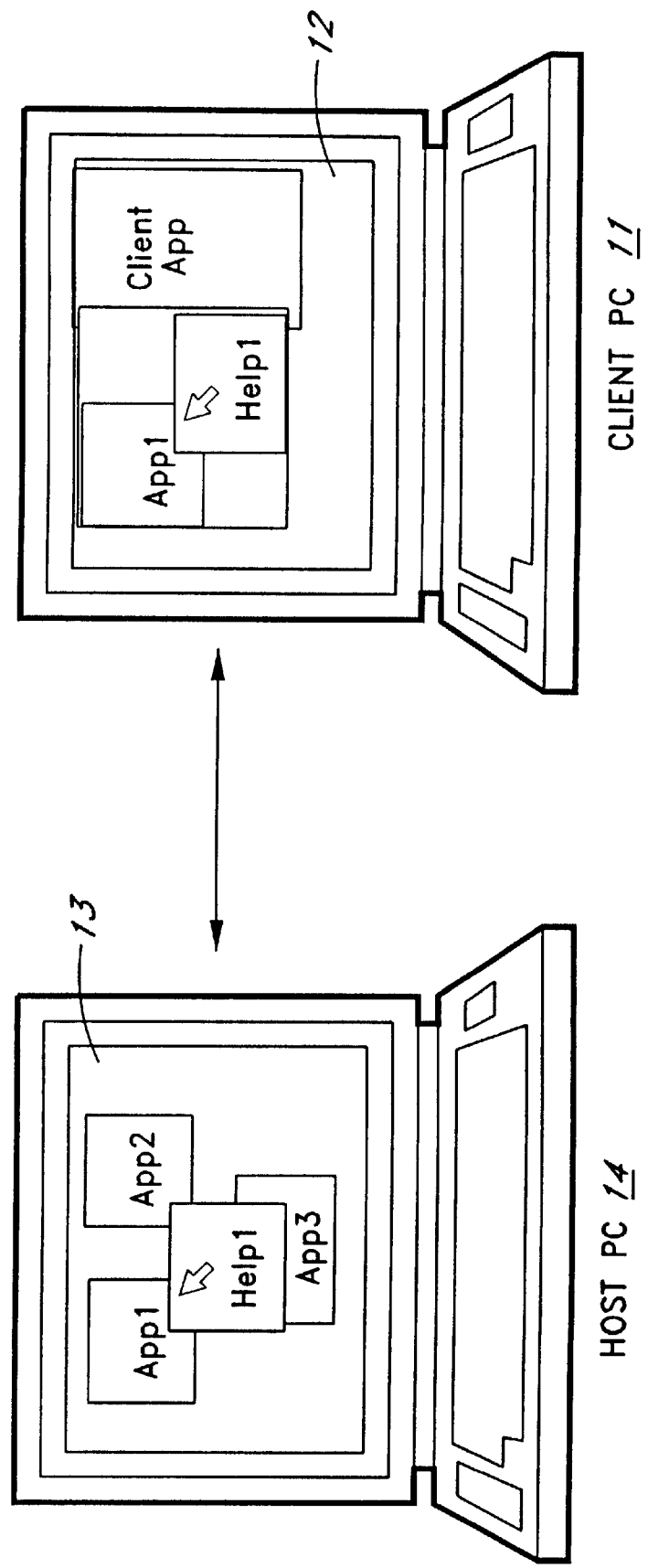
FIG. 7 illustrates the automatic detection of sharing of children of shared tasks feature of the present invention.

In FIG. 7, Host PC 14 displays a shared task application 1 (app 1) and Help application 1 (Help 1) which is started by application 1. Applications 2 and 3 (app 2 and 3) on host system 14 are applications which are not shared. With the automatic detection of sharing of children of shared tasks feature, a newly created task started by a shared task, namely Help 1 created by application 1 is also displayed on the remotely shared rectangle on the display screen of client system 11. In addition, although a newly created shared task overlaps non-shared task applications 2 and 3 on the host system 14, the remotely shared rectangle only displays the shared task application 1 and the newly created shared task Help 1.

Figure 8:
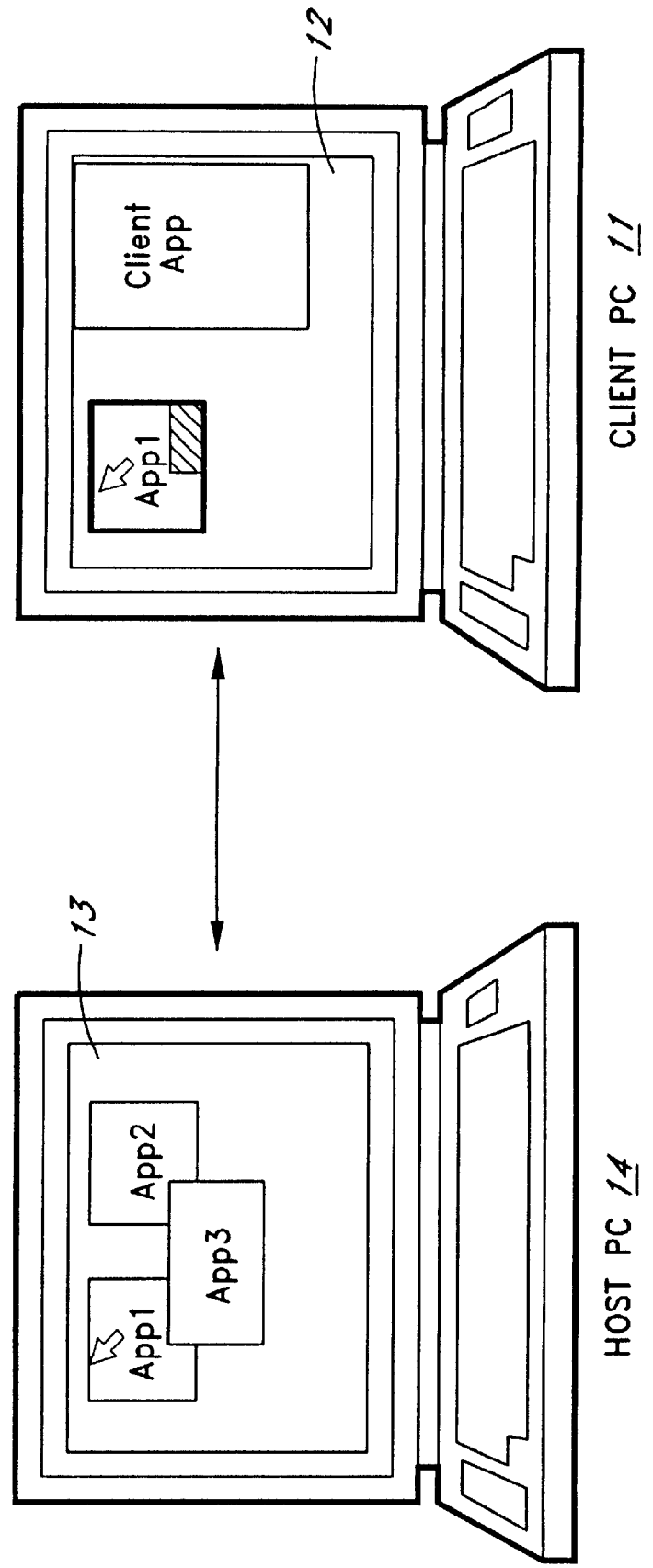
FIG. 8 illustrates the detection of covered portions feature of the present invention.

FIG. 8 illustrates the detection of covered portions feature of the present invention. On host system 14, a shared task application 1 (app 1) is partially covered by a non-shared task application 3 (app 3). The lower right corner of application 1 covered by non-shared task application 3 may contain data. In addition, Windows® does not update covered areas on a screen and data under the covered areas may be consequently stale.

The detection of covered portions of a shared task feature of the present invention draws a transparent hatch over the potentially stale area of the shared task on client system 11's display screen. Because such hatched area is transparent, the client user is still able to read the data located in this hatched area. When application 1 or application 3 is moved, or application 1 is brought to the top of the display screen of host system 14, the hatching on client system 11 is removed and the previously hatched data is updated.

Figure 9A:
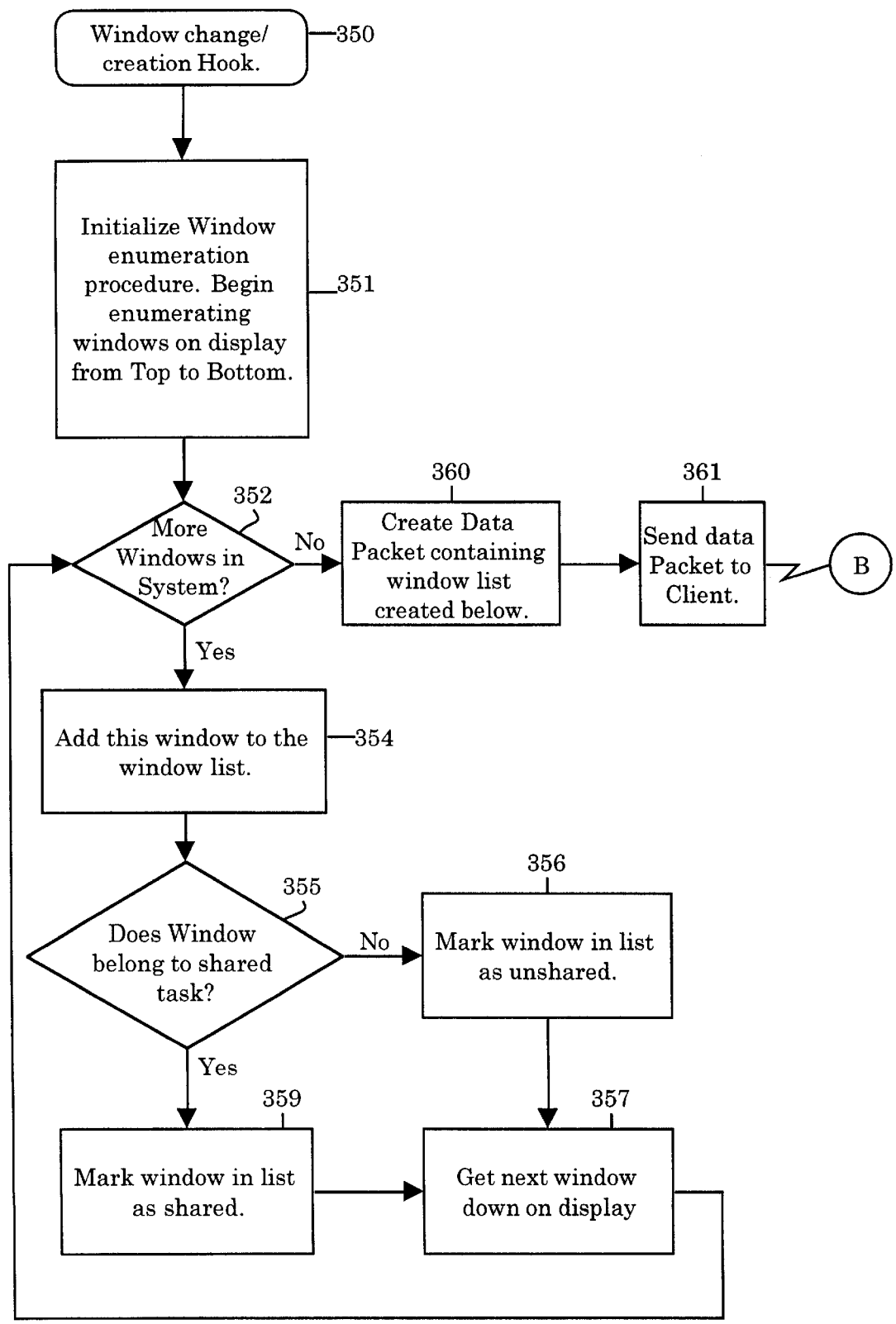
FIGS. 9a and 9b illustrate the detection of covered portions feature of the present invention.

FIG. 9a is a general flow chart illustrating the host side activity of the detection of covered portions feature of the present invention. In block 350, when there is a change in the number or positions of windows on the host system, detection of covered portion of shared tasks feature of the present invention is initiated. In block 351 a window enumeration procedure is initialized which begins enumerating the windows on a display device of the host system from the top of the display device to the bottom of the display device. In addition, information on each window, such as window size and position, are collected. In block 352, if all the windows have not been processed, then the new window is added to a window list in block 354. In block 355, the new window is examined if it belongs to a shared task. If the new window does not belong to a shared task, then in block 356, the new window is marked in the window list as being unshared.

In block 357, the next window on the display is retrieved and examined. Back in block 355, if the new window does belong to a shared task, then in block 359, the window in the list is marked as being shared and in block 357, the next window down on the display is retrieved for examination. Back in block 352, if all the windows have been processed, then in block 360, a communication packet containing the window list created in blocks 354 through 359 is sent to the client system in block 361.

Figure 9B:
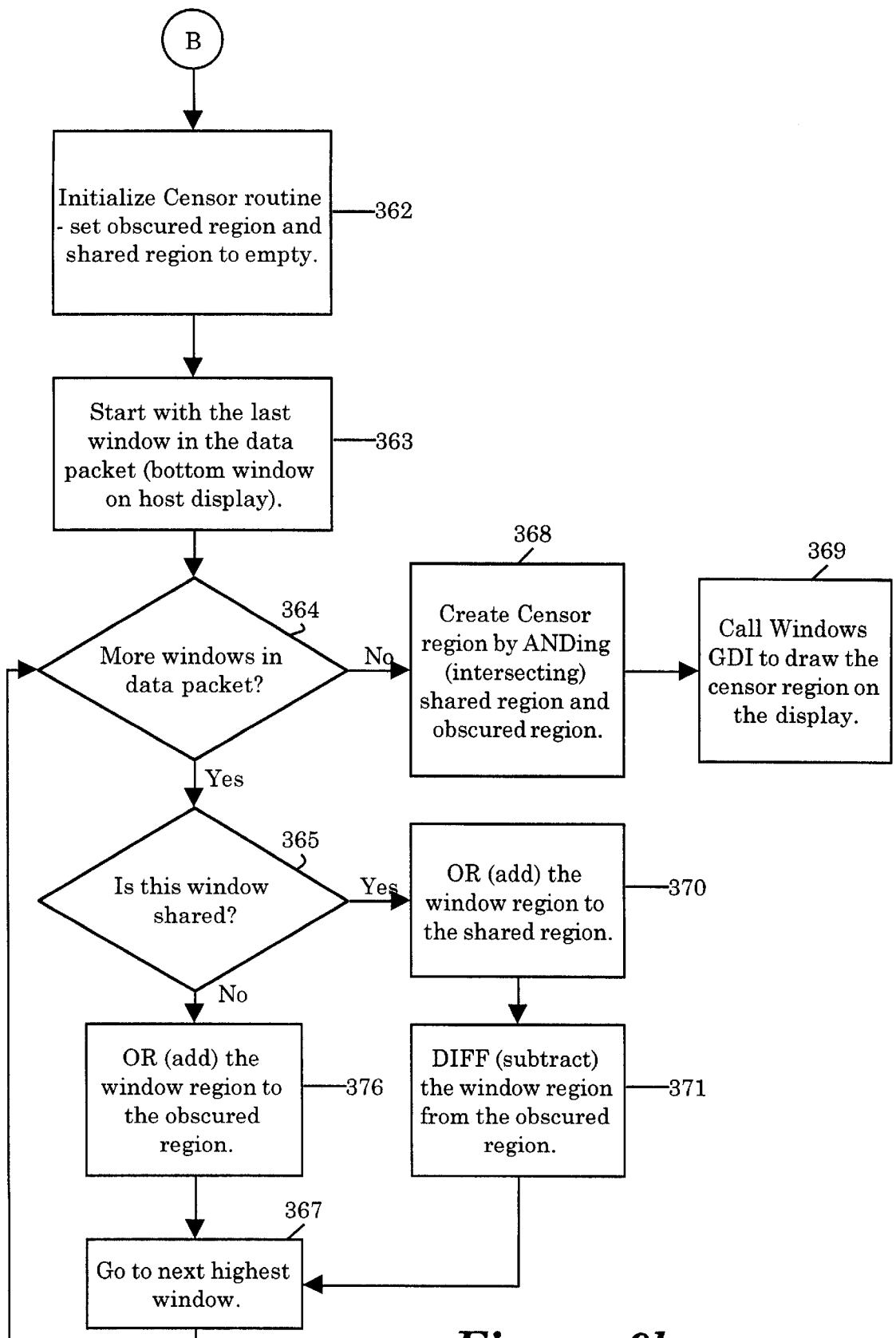

FIG. 9b illustrates the client side activity of the detection of covered portions feature of the invention. Once the communication packet is transmitted to and received by the client system, a censor routine is initialized in block 362 and a shared region of the shared rectangle and an obscured region of the shared rectangle is set to empty. "Regions" are arbitrarily shaped areas. In block 363, the last window in the communication packet, which is the bottom most window on the host display, is examined. In block 365 the window is examined if it belongs to a shared task. If the window does not belong to a shared task then in block 376, the obscured region and the window region are OR'd (added). Then in block 367, the next highest window on the list of communication packets is retrieved for examination in block 364.

In block 365, if the window in the communication packet examined belongs to a shared task, then in block 370 the window region is added to the shared region. Then in block 371, the window region is subtracted from the obscured region. Finally in block 367, the next highest window listed in the communication packet is examined, and the above described process between blocks 364 and 371 is repeated until there are no more windows in the communication packet.

In block 368, after all windows in the packet have been examined, a "censor region" is created by intersecting the shared region with the obscured region. Then in block 369, the graphic device interface is called by the censor routine of the holodeck application to draw the censor region on the display device of the client system.

Figure 10:
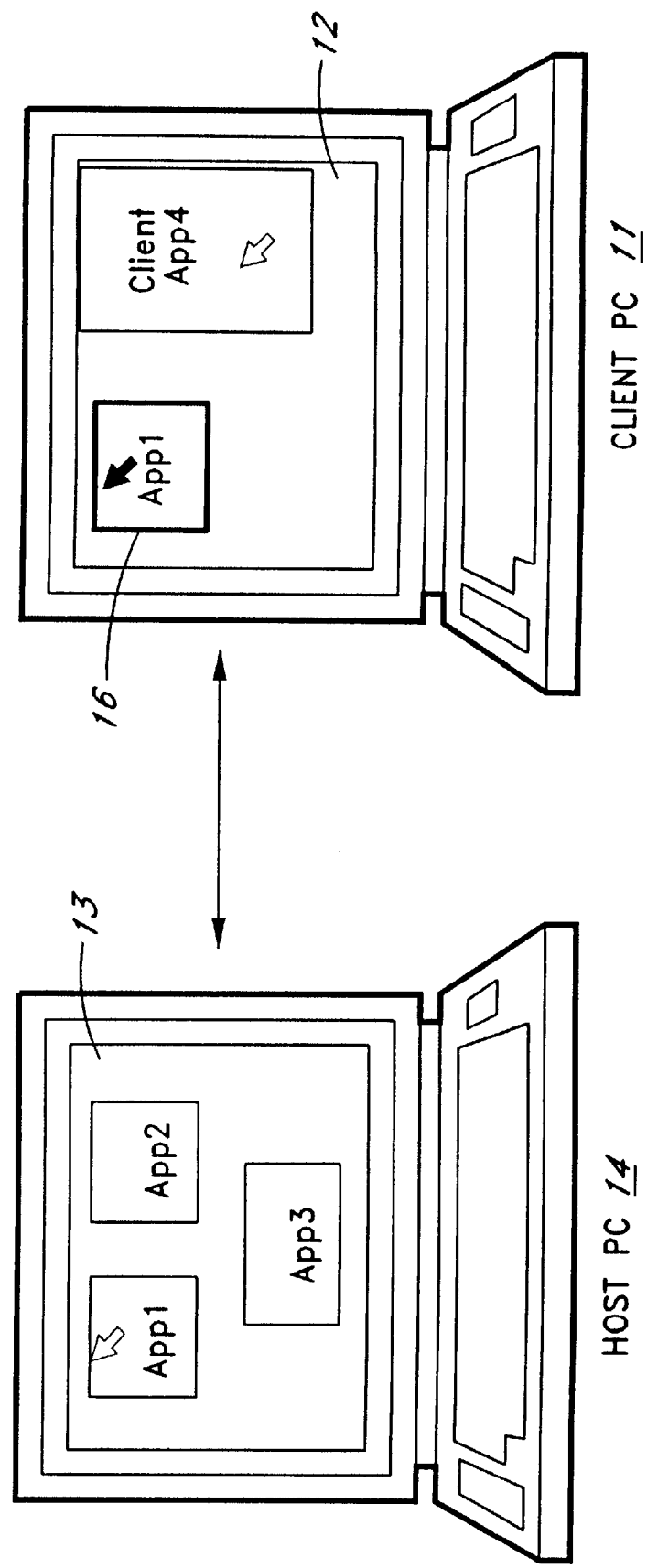
FIG. 10 illustrates the host cursor and client cursor displays of client display device feature of the present invention.

FIG. 10 illustrates the host cursor and client cursor displays on client display device feature of the present invention. On host system 14, the shared application, application 1 (app 1), shows the host cursor in white. In client system 11, the very same shared application, application 1 (app 1), displayed within shared rectangle 16 displays the host cursor in black. Further, the client cursor in client application 4 (client app 4) displays the client cursor in white.

A client user may utilize its own white cursor outside of shared rectangle 16 while the host user manipulates its cursor as displayed in black on shared rectangle 16 on the display screen of client system 11. When the client cursor is moved into shared rectangle 16, the black host cursor and the white client cursor merge and a white cursor is displayed. At that point, both the host user and the client user share the control of the cursor within shared rectangle 16.

Figure 11:
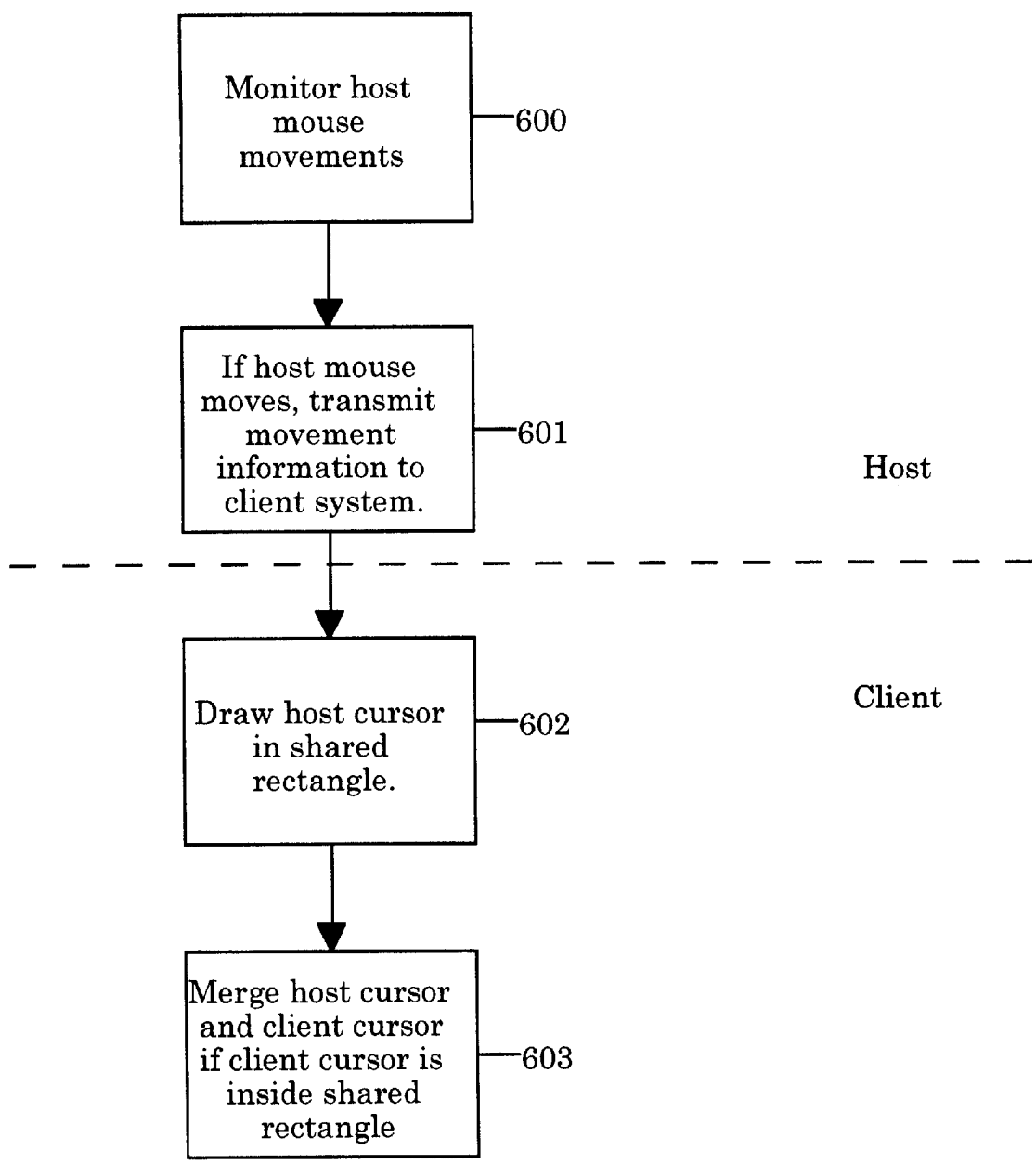
FIG. 11 illustrates the host cursor and client cursor displays on client display screen feature of the present invention.

FIG. 11 is a general flow chart describing the host cursor and client cursor displayed on client display screen feature of the present invention. In block 600, the sensor application of the host system monitors the cursor movements of the host system Windows® application. In block 601, whenever the cursor (mouse) moves, the sensor application sends the movement information to the client system. In block 602, if the client's cursor is currently outside of the shared rectangle window, then the holodeck application of the client system draws an image of the host cursor in the shared rectangle on the client system display device. Thus there will be two cursors on the display screen of the client system. To distinguish the two cursors from each other, the host cursor displayed within the shared rectangle on the display device of the client system is in black and the cursor of the client system which is outside of the shared rectangle window remains its normal color which is typically white. In block 603, when the client system cursor which is outside the shared rectangle window moves into the shared rectangle window, the host system remote cursor within the shared rectangle window and the client system cursor both on the display device of the client system are merged to create a single cursor displayed on the display screen of the client system. This single cursor will be in the normal cursor color of white.

Figure 12:
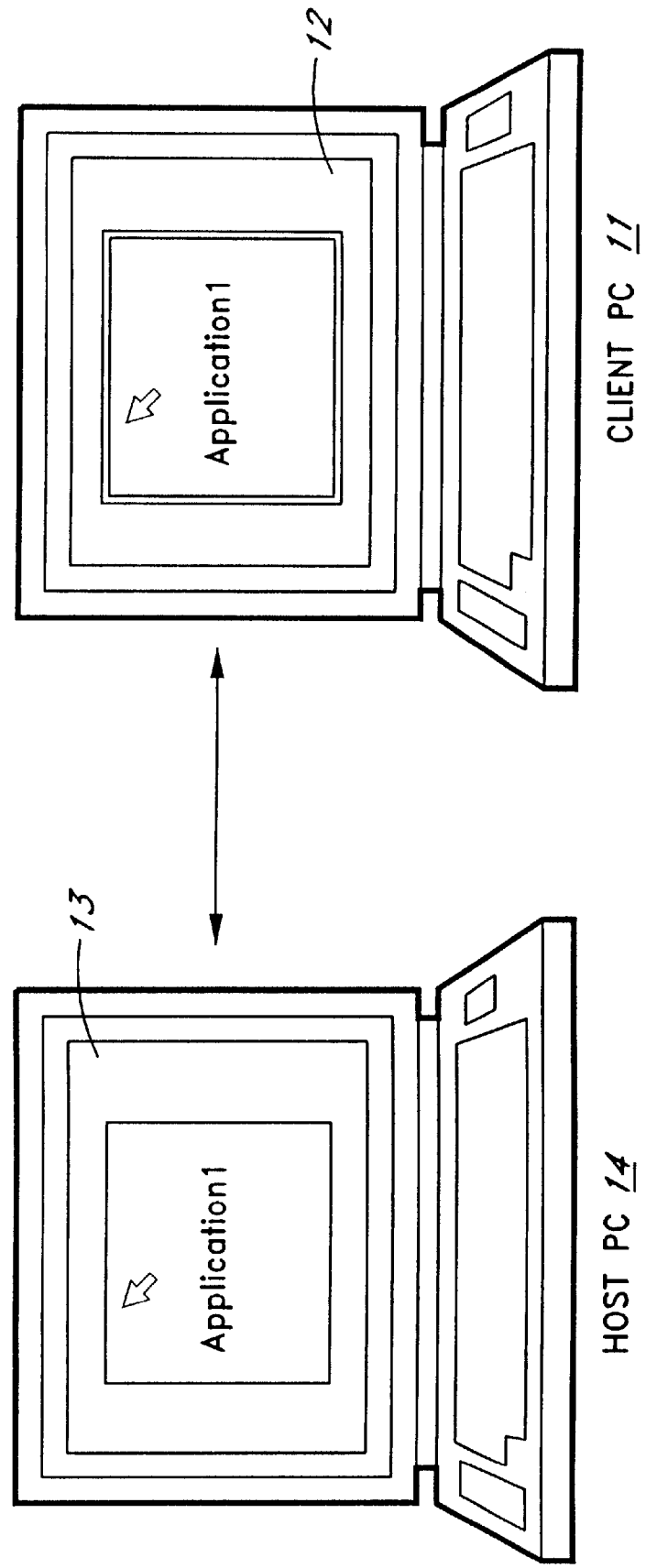
FIG. 12 illustrates the display driver rendering of shared fonts feature of the present invention.

FIG. 12 illustrates the display driver rendering of shared fonts feature of the present invention. In a Windows® application environment, a user may choose fonts according to a descriptive name, point size, weight, etc. Windows® selects a font type which is the closest match to the requested font type. A user of a Windows® application may install any fonts they choose and hence different users may have different font resources. Given two different PC's, and hence possibly two different selections of fonts, a client system 11 may display text in different fonts than that of a host system 14. In addition, a list of characters on client system 11 may not match the list of characters and corresponding font type in host system 14. If the host user moves the cursor on host system 14, the cursor on client system 11 may not appear to be in the same position as the cursor of host system 14 due to differing font types. Normally, the graphic device interface and the Windows® application retrieve either the selected font type or the font type that is the closest match from its font resource file on its disk and feeds it to its display driver. In order to solve this problem, the font information retrieved from host system 14 is compressed and transmitted directly to the display driver of client system 11 bypassing the graphic device interface of client system 11. Client PC 11 is then able to display the font as selected on host system 14 without having the selected font type in its font resource files on its disk.

Figure 13A:
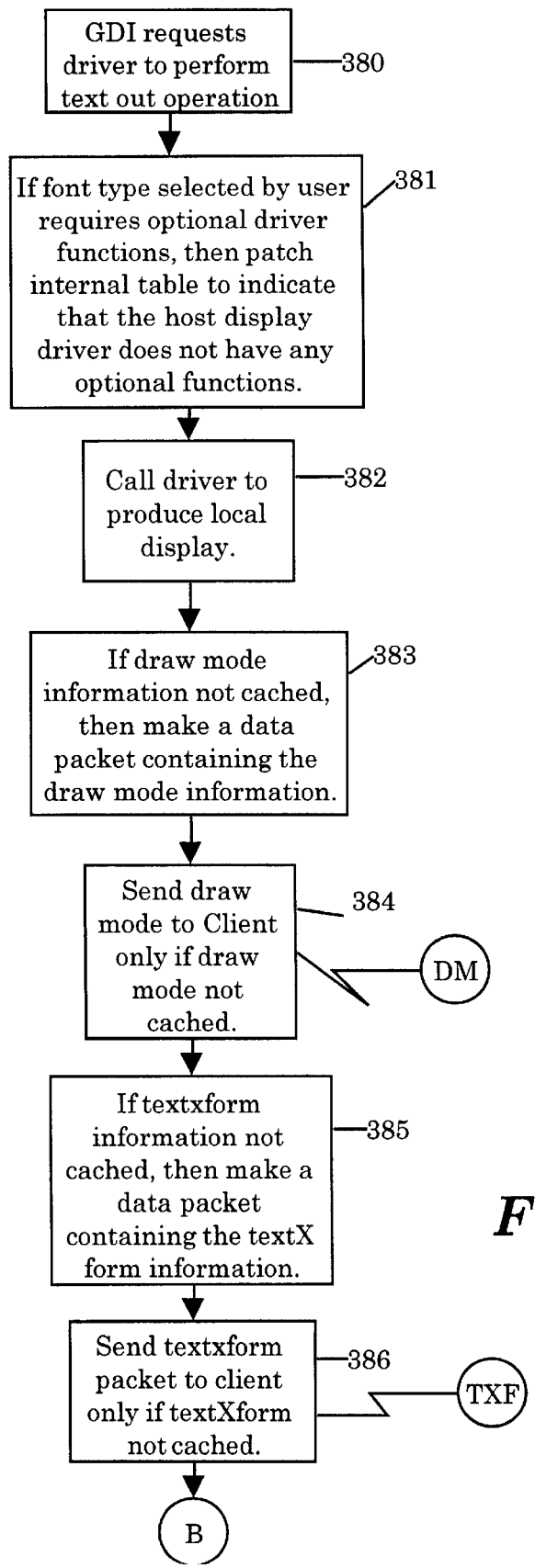
FIGS. 13a through 13d are general flow charts illustrating the above described display driver rendering of shared fonts feature of the invention.
Figure 13B:
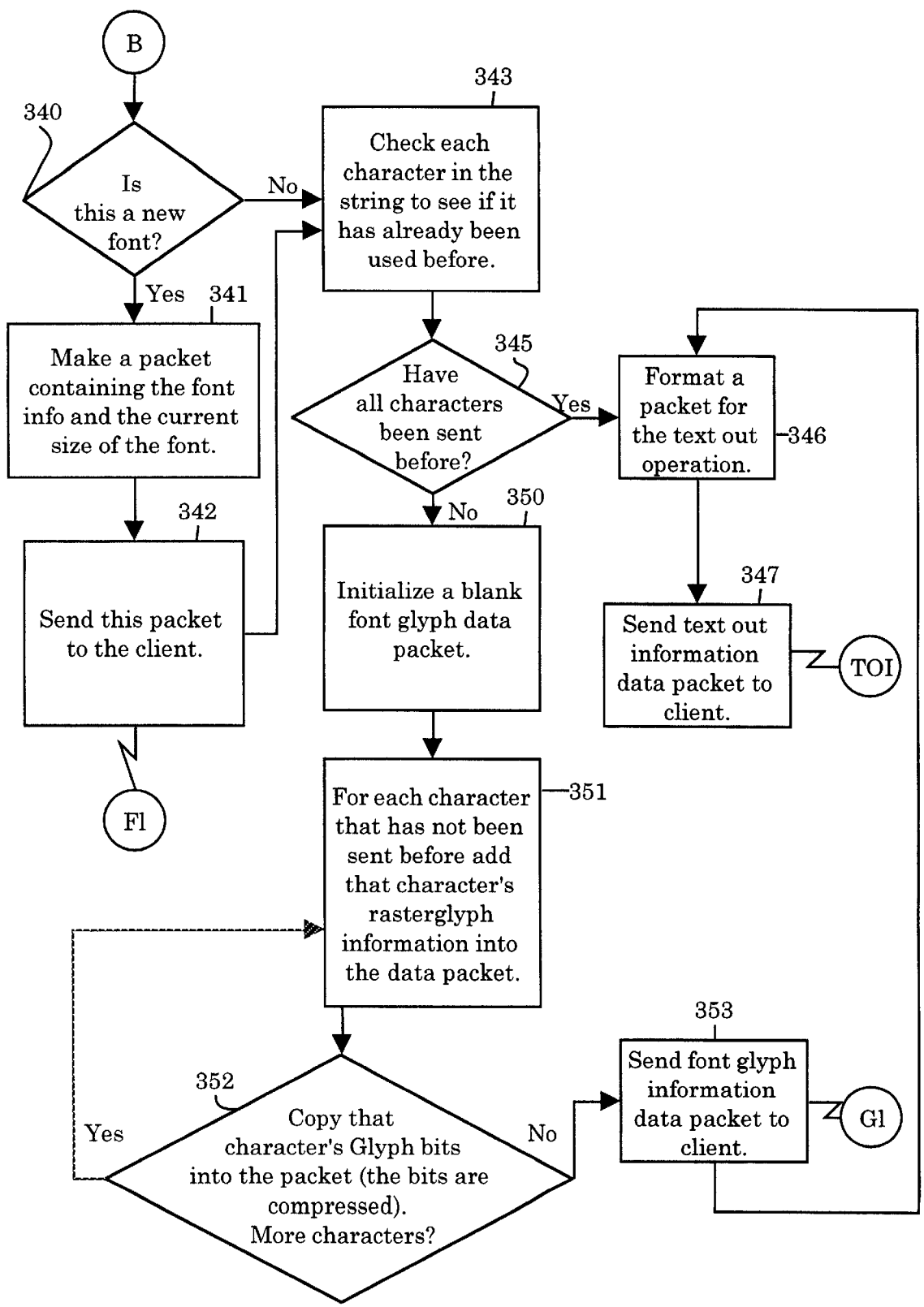

FIGS. 13a through 13d are general flow charts illustrating the above described display driver rendering of shared fonts feature of the invention. FIGS. 13a and 13b illustrate the host system side activities. In block 380, text drawing with a chosen font is initiated on a shared application. In block 381, an internal table containing information on all the display driver capabilities is modified to indicate that the display driver only has the required set of minimum functions and does not have any optional functions. In block 382, the sensor application of the host system calls the display driver to produce the local display. In block 383, if draw mode information have not been cached, a communication packet containing the draw mode information is created. In block 384, this communication packet containing the draw mode information is transmitted to the client system. In block 385, if textXform information have not been cached, then a communication packet containing the textxform information is created. In block 388 the textXform communication packet is transmitted to the client system.

In block 340, the selected font is examined if it is a new font, not in the font cache of the host and client systems. In block 341, if the font selected is indeed a new font then a communication packet containing the new font information and the current size of the font is created. In block 342, the communication packet containing the font information and current size of the font is transmitted to the client system.

In block 343, each character in the string is examined if they have been transmitted to the client system before. Some fonts are created incrementally as new characters are used by the application. In such a case, just these new characters may be transferred to save time. In block 345, if all the characters in the string being transmitted have been transmitted before, then in block 346, a communication packet for a text output operation is formatted. In block 347, a communication packet containing the text output information is transmitted to the client system.

Back in block 345, if there is any character in the string to be transmitted to the client system which has not been transmitted to the client system before then in block 350, a blank font glyph communication packet is initialized. In block 351, for each character that has not been transmitted to the client system before, that character's rasterglyph information is added to the font glyph communication packet in a meta font format of the present invention. In block 352, for each character that has not been transmitted to the client system, the character's glyph bits are copied into the font glyph communication packet. In block 353, the font glyph communication packet is then transmitted to the client system.

Figure 13C:
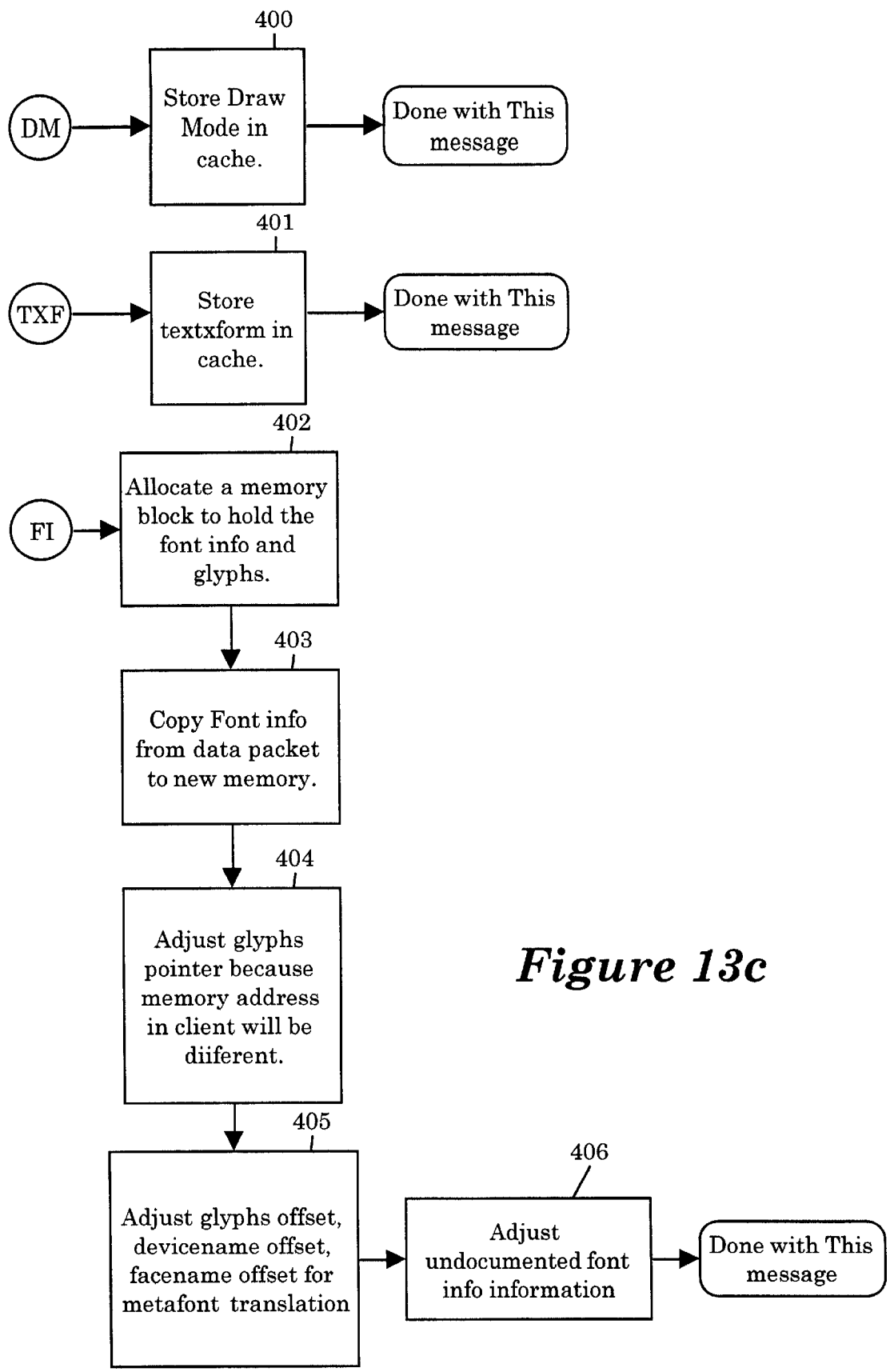
Figure 13D:
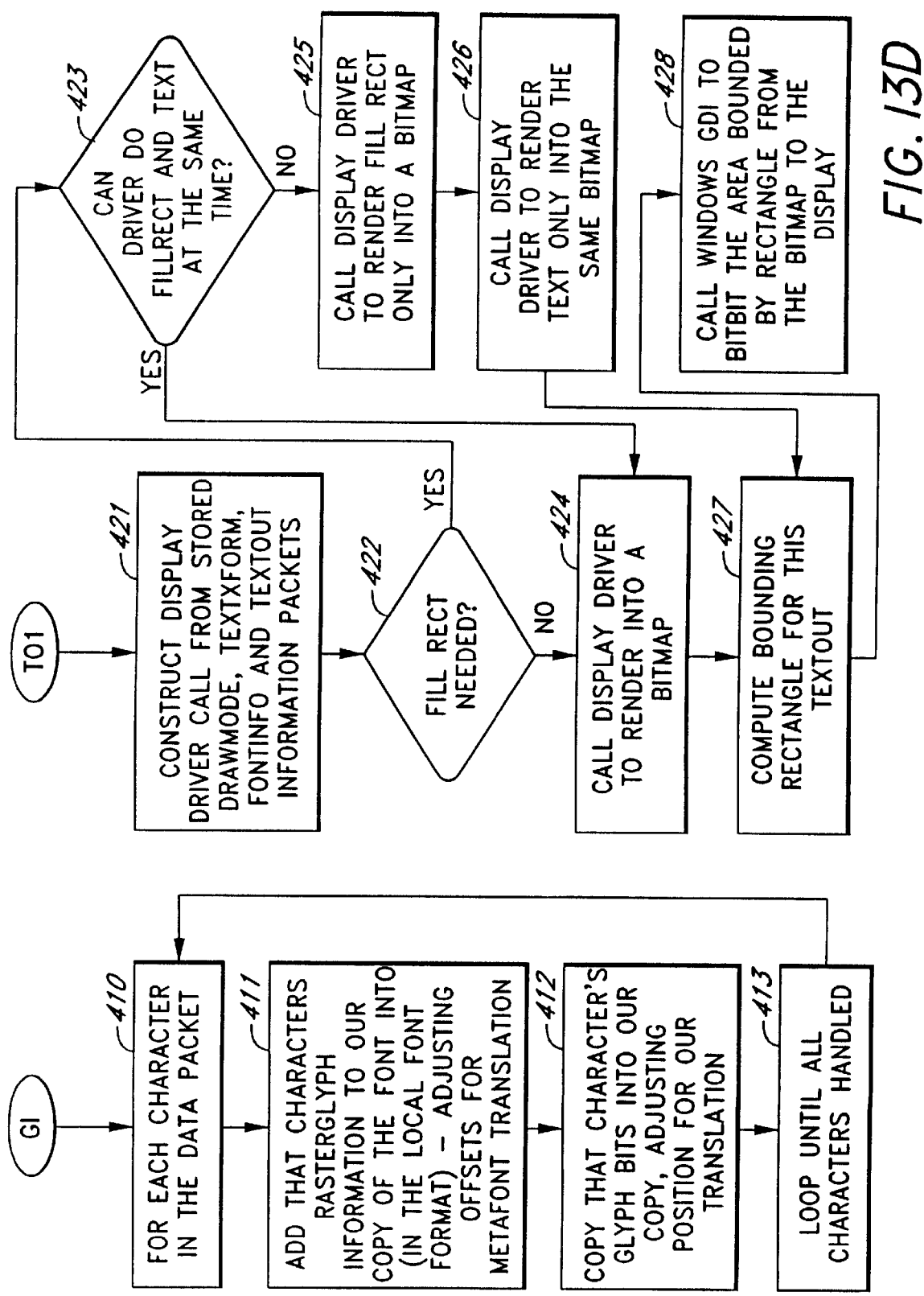

FIGS. 13c and 13d are general flow charts illustrating the client system side of the process involved in the display driver rendering of the shared fonts feature of the present invention. In block 400, the client side holodeck application receives the communication packet containing the draw mode information and stores the draw mode information in its cache. In block 401, the client side holodeck application receives a communication packet containing the textxform information and stores the textXform information in its cache. In block 402, the client side holodeck application receives the communication packet containing font information and the current size of the font of the text being transmitted from the host system. The client side holodeck application then allocates a memory block to store the font and glyphs information transmitted from the host system. In block 403, a copy of the font information from the communication packet is then stored to the memory space allocated in the client system by the holodeck application.

In block 404, the glyphs pointer for the font information is adjusted to point at the new client memory location where the font information is stored. In addition, in block 405 glyphs offset, device name offset, face name offset are adjusted for meta font translation to the new client memory location where the font information is stored. Further, any undocumented font information are adjusted in block 406.

In block 410 of FIG. 13*d,* the communication packet containing font glyph information transmitted from the host system is received by the holodeck application of the client system. In block 411, for each character in the communication packet, the character's rasterglyph information is added to the client system's copy of the font information and offsets for meta font translation are adjusted. In addition in block 412, the character's glyph bits are copied into the client system's copy of the font information and the glyph bits position is adjusted for translation. The process from block 410 to block 412 is repeated until all characters in the communication packet are processed.

In block 421, a call to the display driver to reproduce the text displayed on the host machine on the client machine is constructed. The text to be displayed on the client machine is constructed from the stored Draw mode, TextXform, Font information and text output information contained in the corresponding communication packets as transmitted by the host system.

In block 422, if the text background rectangle needs to be filled, and in block 423, if the client system display driver is able to fill the text background rectangle and draw the text at the same time, then in block 424 the display driver is called to render the text and to fill the text background rectangle into a bit map.

Otherwise in block 425 the display driver is called to render only the filled rectangle into a bit map. In block 426 the display driver is called to render only the text into the same bit map. In block 427, the bounding rectangle measurements are computed for this text output operation. In block 428, Windows® graphical device interface of the client system is called to bitblt the area bounded by the rectangle from the bit map to the display device. The graphical device interface then calls the display driver to actually copy the bits to the display which shows the text transmitted by the host system.

Figure 14:
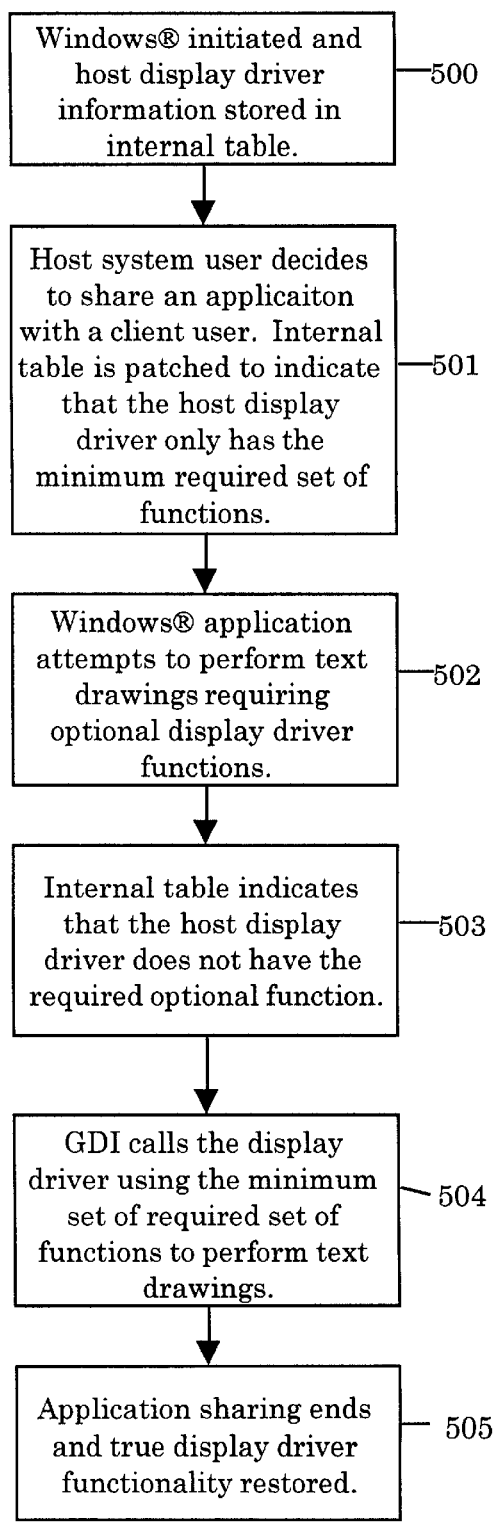
FIG. 14 illustrates a general flow diagram for the restricting windows graphic display interface feature of the present invention.

FIG. 14 illustrates a general flow diagram for the restricting windows graphic display interface feature of the present invention. Device drivers support both a required set of functionality as well as a set of optional functionality. The type and the number of optional functions a display driver supports varies from display driver to display driver. Device drivers support optional functions to speed up drawing operations. Whenever a display driver does not support an optional function, Windows® Graphical Device Interface is able to simulate the optional function which the display driver does not support using the display driver's required functions.

Enabling a text drawing operation with a display driver may lead to discrepant text if the display driver of the client system and the display driver of the host system differ in the type of optional functionality they respectively support. For example, given a host display driver which is able to support a bold text functionality, if the client display driver is not able to support the bold text functionality, then the text which is displayed on the client system display screen will not be bold and thus be discrepant from the text of the host system and its image.

In the general flow chart of FIG. 14, in block 500, a Windows® application is initiated on the host system and the Windows® Graphical Device Interface examines the host system display driver capabilities and stores appropriate information in an internal table. In block 501, when a user on the host system decides to share an application, the sensor application retrieves the internal table and patches it to indicate that the host display driver only has the minimum set of required functionality and no optional functionalities. In block 502, when a Windows® application attempts to perform a text drawing operation requiring optional display driver functions, Windows® Graphic Device Interface examines the internal table which contains the display driver capabilities. In block 503, the internal table indicates that the host display driver does not have the required optional functions. The Windows® GDI (Graphical Device Interface) concludes that the host display driver is not able to perform the operation. In block 504, the Windows® GDI then produces the text drawing information to perform the prompted text drawing operation utilizing the specific minimum set of functionalities required which are stored in the internal table and passes that information to the host display driver. For example, to print bold text on a device without bold capabilities, GDI can call the driver to print normal text twice. The font information is then transmitted to the client system. In block 505, when the host user has finished sharing applications, the sensor application sets the Windows® application's internal table back to their original state allowing the host system to make full use of the display driver capabilities including all optional functionalities.

Figure 15:
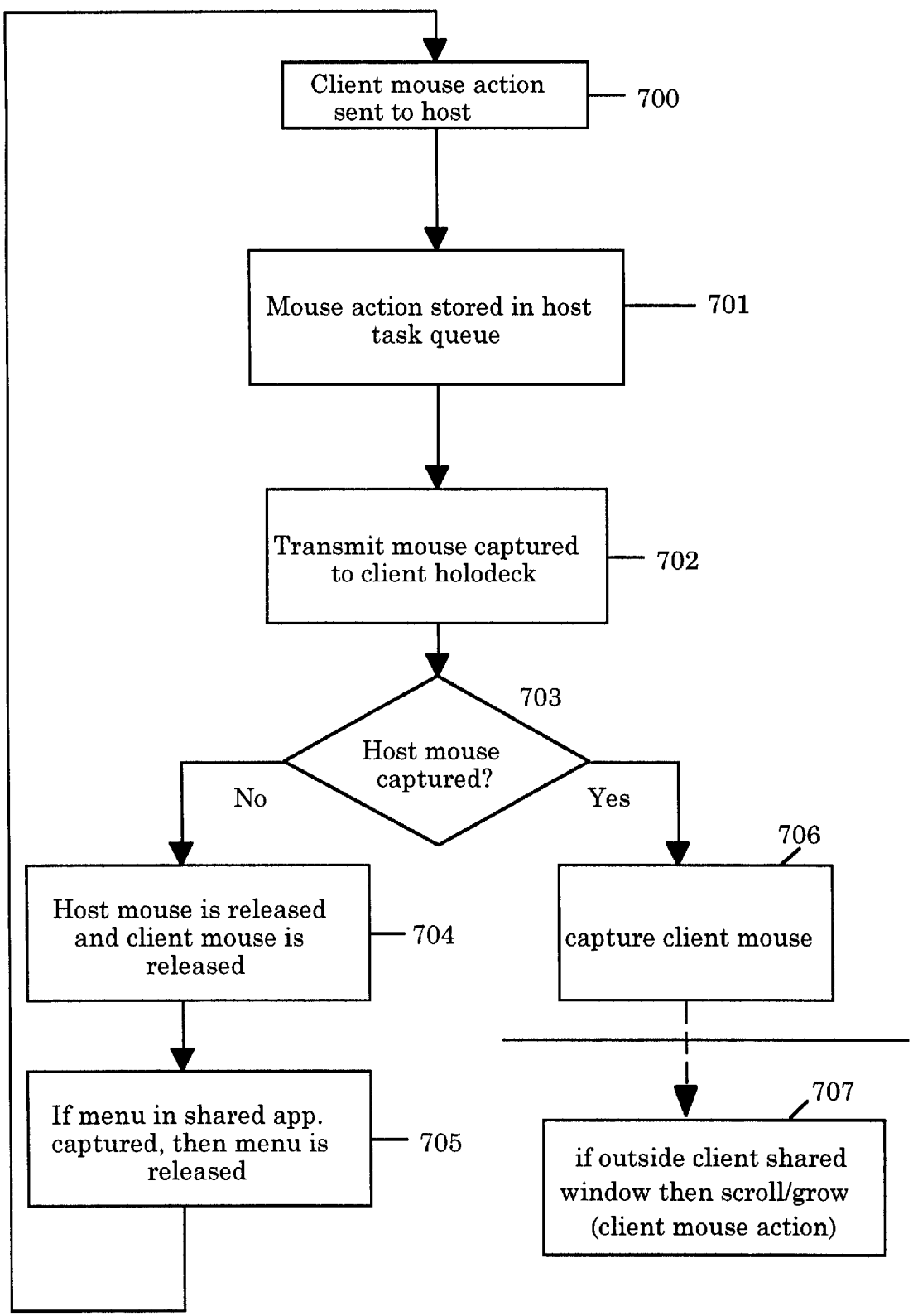
FIG. 15 is a general flow chart illustrating the dragging the mouse remotely feature of the present invention.

FIG. 15 is a general flow chart illustrating the dragging the mouse remotely feature of the present invention.

In a "traditional" remote control method, the client screen contains nothing except for the host display image, and there is only one mouse/cursor to work with on the client screen. Therefore a simple approach of transmitting all mouse actions on the client screen directly to the host machine is used.

In a "rectangle" remote control method, all mouse actions in the shared rectangle on the client machine are transmitted to the host machine. Any mouse actions by the client user outside of the shared rectangle are not recognized by the host machine. A client user may initiate a mouse action, such as clicking down the mouse while the cursor is within the shared rectangle to begin selecting menu. Subsequently, the client user may move the mouse outside of the client rectangle while continually dragging the mouse (i.e. moving the mouse while clicking down the mouse). No mouse actions are transmitted to the host machine and the shared rectangle will appear as if the menu selection operation is in a suspended state.

What is more desirable is to have certain client mouse actions transmitted to the host machine even if the client mouse has moved outside of the shared rectangle. For example given the above described scenario, the client user may click on the menu and drag down the menu. After the client mouse is moved outside of the shared rectangle while the client mouse is dragging/clicked down, the client user clicks off the mouse, discontinues dragging and moves the mouse to an unshared application window. In this scenario, instead of having a shared window menu in an open suspended state waiting for a possible selection, it is more desirable for the clicking off of the client mouse outside of the shared rectangle to be transmitted to the host machine. The transmitted clicking off of the client mouse is then performed on the host system such that the menu opened up in the shared rectangle closes.

The general flow chart in FIG. 15 illustrates the dragging the mouse remotely feature of the present invention including transmission of client mouse actions outside of the shared rectangle.

With the dragging the mouse remotely feature of the present invention, even if the client mouse moves outside of the shared rectangle, the host system still receives all the client mouse actions. When a client user performs a mouse action for the shared application, the actual performance of the mouse action is not initiated on the client system, rather the mouse actions of the client is first initiated on the host application where the actual Windows® application is running.

When a menu is visible, the menu reacts to a click anywhere on the display screen, a click on the menu selects an operation and a click elsewhere dismisses the menu without selecting an operation. If the client user clicks the mouse outside of the client window, the holodeck application of the client system transmits an event to the host system sensor application to dismiss the menu and re-transmits the click to the appropriate client window in the client system. Thus, whenever the client user clicks on a host application menu and then clicks on a local window i.e. an unshared window, the host application menu will disappear and a local window will become active.

In blocks 700 and 701, as soon as the client user performs a mouse action for the shared application that is running on the host system, the host system receives the corresponding mouse action in the shared Windows® application and the Windows® application may "capture" or release the mouse. If so, the event is transmitted to the client system in block 702.

In block 703, the host event is examined to determine if the host mouse is captured. In block 704, if the event transmitted by the host system to the client system is a mouse release event then the client mouse is released. In block 705, if a menu in the shared application is captured, then the actions are transmitted back to the host system and the host system actually performs the task of releasing the menu. This image is transmitted back to the holodeck application of the client system by the sensor application of the host system via the conferencing communication system of the respective systems. At the same time, the sensor application of the client system re-transmits the click to the appropriate client window of an unshared application of the client system. In block 706, if the host mouse is captured then the client system captures the client mouse.

In block 707, if the client mouse is being dragged outside the client shared window then either an autoscroll or an autogrow is performed.

In the "task based application sharing" remote control environment of the present invention, the client shared rectangle may be smaller than the host rectangle. The client user may control which part of the shared area is visible within the smaller client rectangle by "panning" or "scrolling" while the client mouse is captured. If the client mouse is moved outside the client rectangle, the client rectangle automatically pans, or scrolls in that direction.

If a client rectangle is panned/scrolled from the edge of the client rectangle towards the edge of the host rectangle, the client rectangle automatically grows in that direction towards the edge of the host rectangle. Hence, when the client user is resizing or moving a shared window, the client user is able to see the visual feedback that the host system transmits to the client system for such an operation. In addition, Windows® application draws a gray rectangle that moves with the mouse during a resizing or a moving of a shared window. Further, when the client mouse is no longer captured, the remotely shared rectangle on the client system is restored to its usual size.

FIGS. 16 through 19 are general flow charts illustrating the transmission of information on mouse and keyboard movement between a client system and a host system during a task based application sharing process of the present invention.

When a client user performs a mouse or keyboard movement in the client remotely shared rectangle, the mouse and keyboard movements are actually performed on the shared windows on the host system. Traditional remote control applications allow the client user to use the mouse and keyboard to control the entire host system.

The task based application sharing method of the present invention restricts the control allowed to a client to only the windows of the applications that the host user has chosen to share.

The host system's sensor application transmits information regarding currently shared input windows to the client system's holodeck application. The client holodeck application in turn filters mouse and keyboard events received by the client user making inputs to the remotely shared client rectangle. All mouse movements are transmitted to the host system. Mouse actions ("clicking") in the remotely shared rectangle on the client system on an unobscured shared area are transmitted to the host system.

Mouse actions in a remotely shared rectangle on the client system which are performed on an obscured area (unshared application) are not transmitted to the host system. Instead the client system signals the client user that an erroneous input has been made. The client system may signal the client user by, for example, sounding a beep.

Keyboard movements are transmitted to the host system if the current input window on the host system is shared. All mouse and keyboard events which are performed on an unshared application are rejected by the client holodeck application and are not transmitted to the host system. Once the host system receives information on mouse and keyboard movement information from the client system, the host system simply inserts the mouse and keyboard events into the host system event queue as if the host user had caused the events locally.

Figure 16:
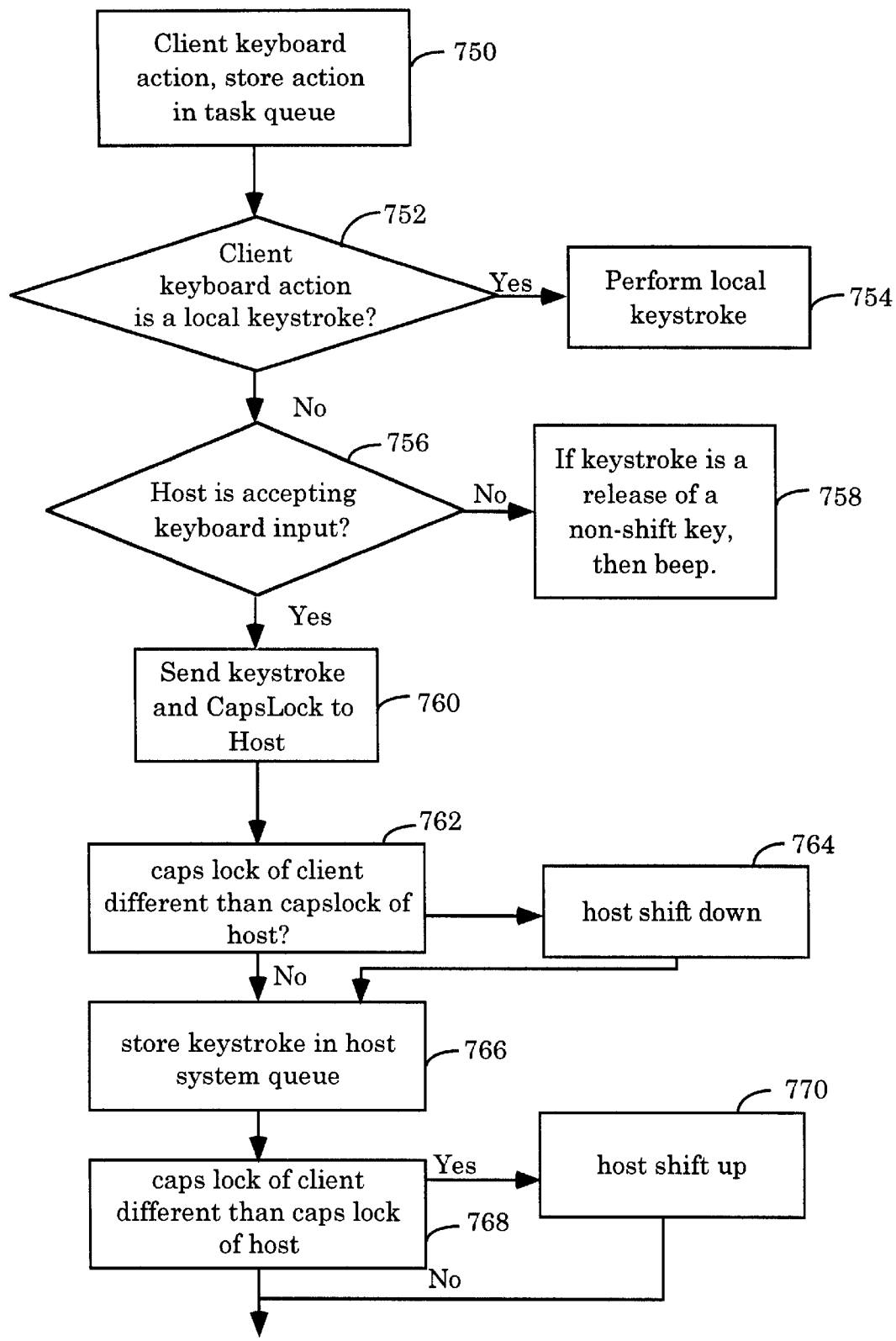
FIG. 16 is a general flow chart illustrating the transmission of keystroke information from a client system to a host system during a task based application sharing process of the present invention.

FIG. 16 is a general flow chart illustrating the transmission of keyboard events from the client system to the host system. Client keyboard actions are stored in the client system task queue in step 800. In step 801, if the keystroke should be handled by 202 directly, then in step 802, the client keyboard actions are performed locally on the client system. Otherwise, in step, the client keyboard action should be sent to the host. In step 803 if the host system is accepting keyboard inputs then the keyboard inputs are transmitted to the host system along with a variable, CapsLock, which indicates whether the keyboard of the client has CapsLock enabled.

If the host system is not accepting keyboard inputs, then in step 804, if a keystroke is a release of a non-shift key then the client system sounds an error beep. In step 806, the keystrokes transmitted by the client system is received by the host system.

If the CapsLock of the client keyboard differs from the CapsLock of the host, then the host inserts a shift down in the host system queue before inserting the keystroke and subsequently adds a shift up.

Figure 17:
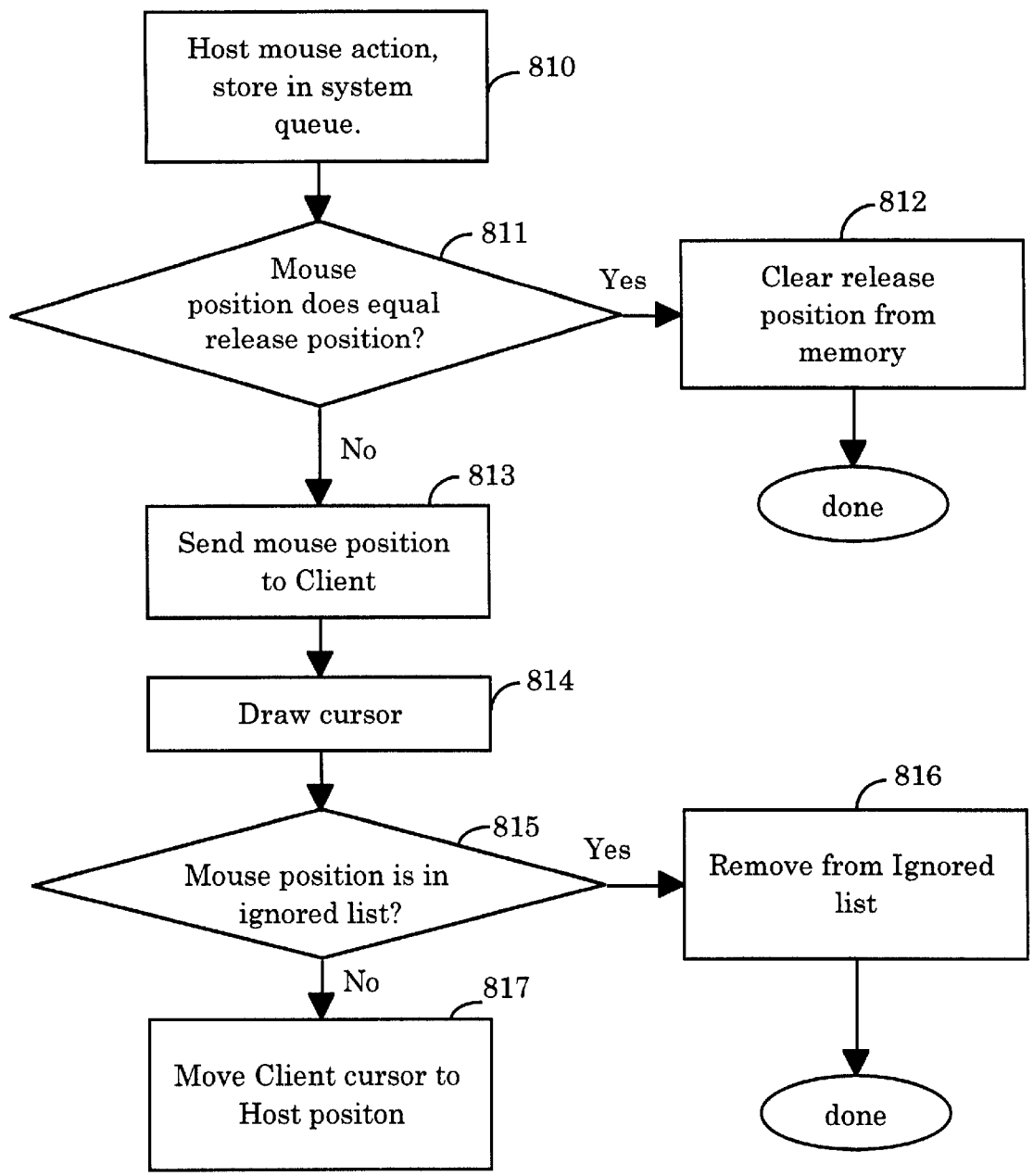
FIG. 17 is a general flow chart illustrating the transmission of mouse position information from a host system to a client system during a task based application sharing process of the present invention.

FIG. 17 is a general flow chart illustrating the transmission of mouse positions from the host system to the client system. In step 810, host mouse actions are stored in the host system queue. In step 811, if the current mouse position equals the previous mouse release position, then in step 812, the previous mouse release position stored in the memory is cleared.

In step 813, the information on the mouse position is transmitted from the host system to the client system. In step 814, the client system draws a cursor on the window of the holodeck application 202. In step 815, if the mouse position is in an ignored list then the mouse position is removed form the ignored lists in step 816. Finally in step 817, the client cursor on the client display is moved to the mouse position performed by the host user.

Figure 18:
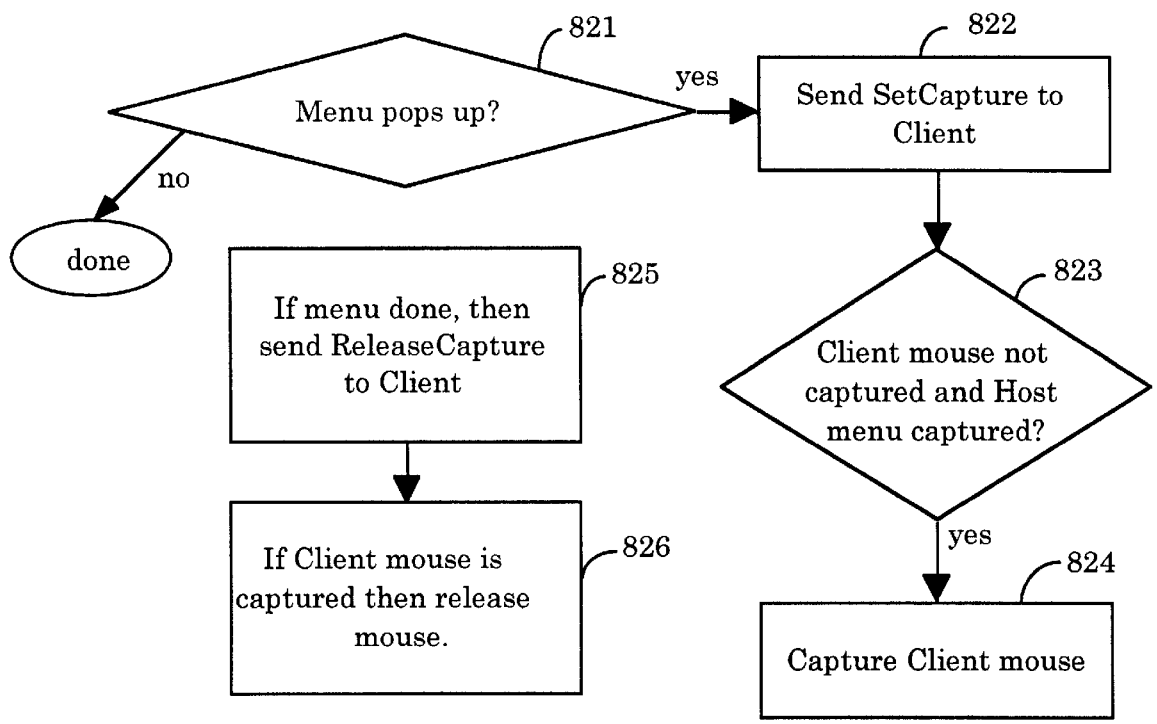
FIG. 18 is a general flow chart illustrating the transmission of captured mouse movement information from a host system to a client system during a task based application sharing process of the present invention.
Figure 19A:
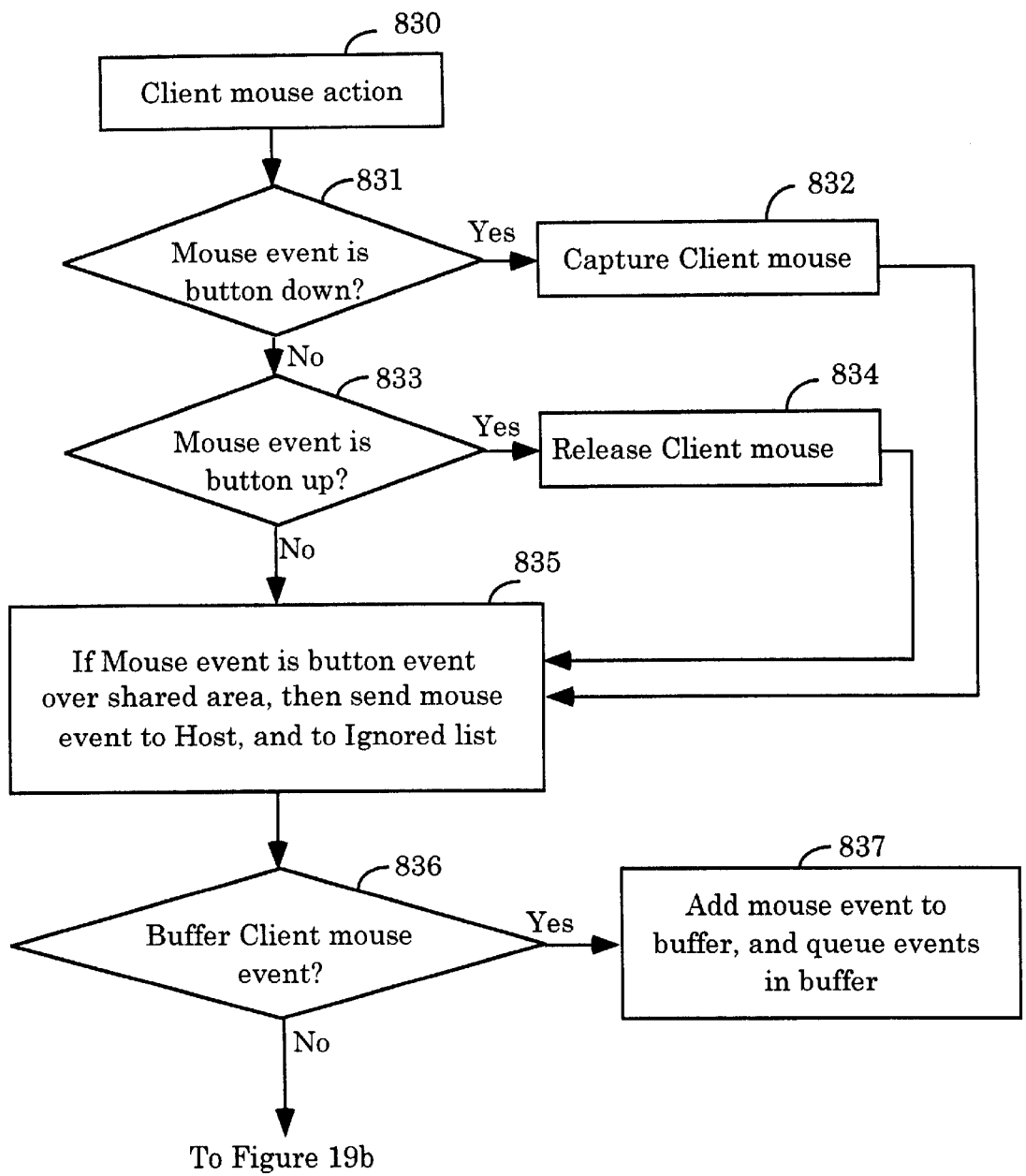
FIGS. 19a through 19d are general flow charts illustrating the transmission of mouse event information from a client system to host system during a task based application sharing process of the present invention.
Figure 19B:
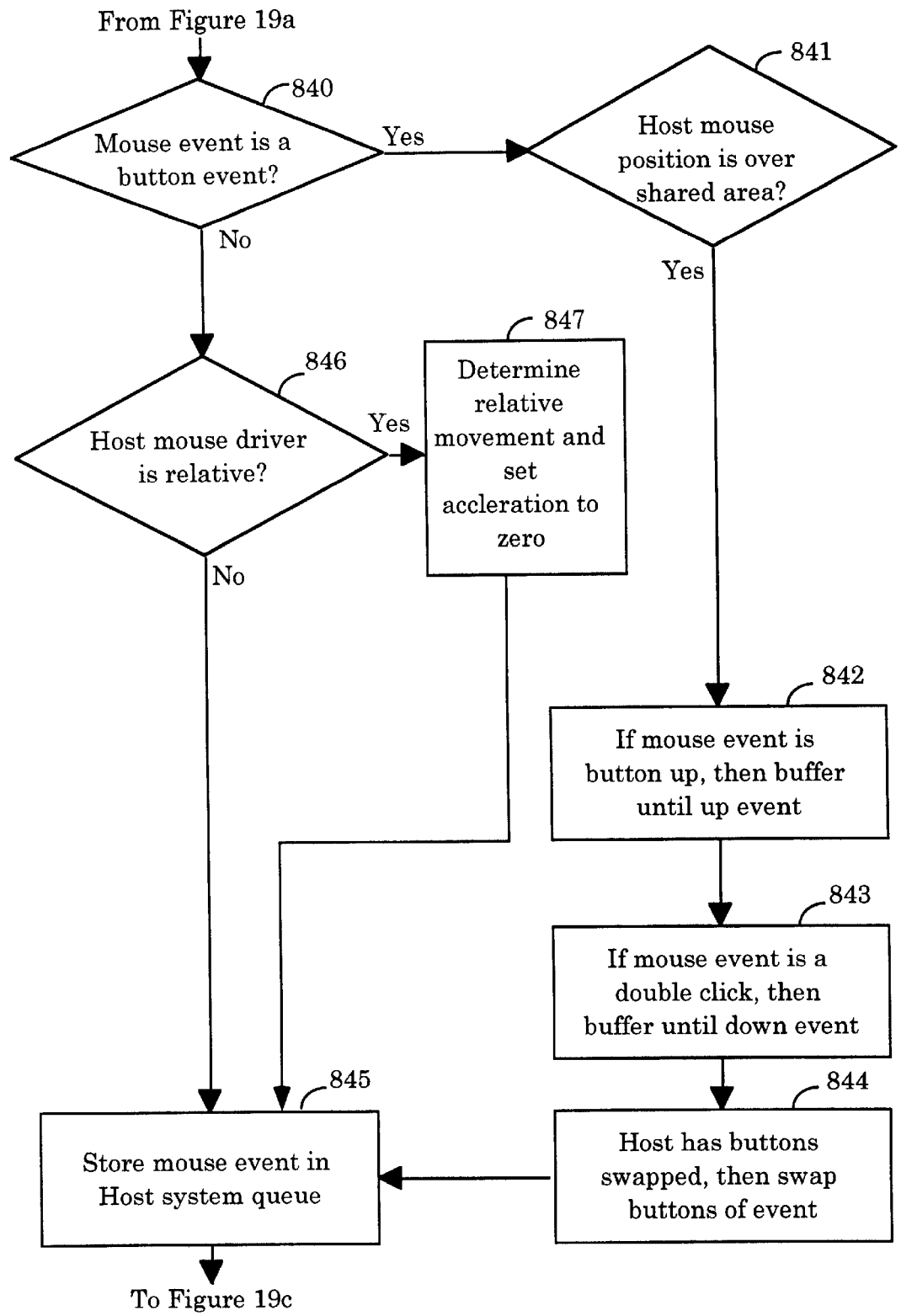
Figure 19C:
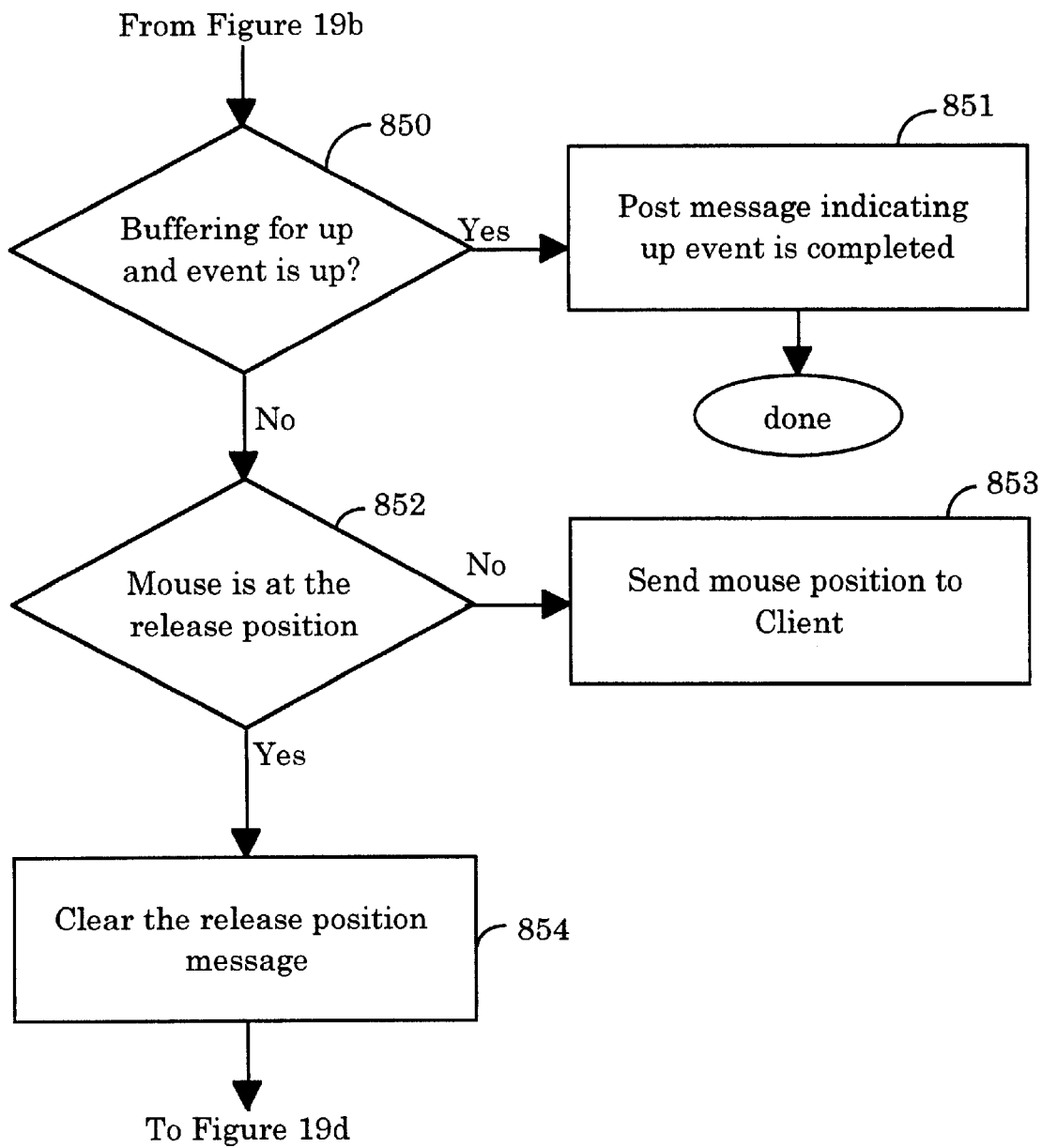
Figure 19D:
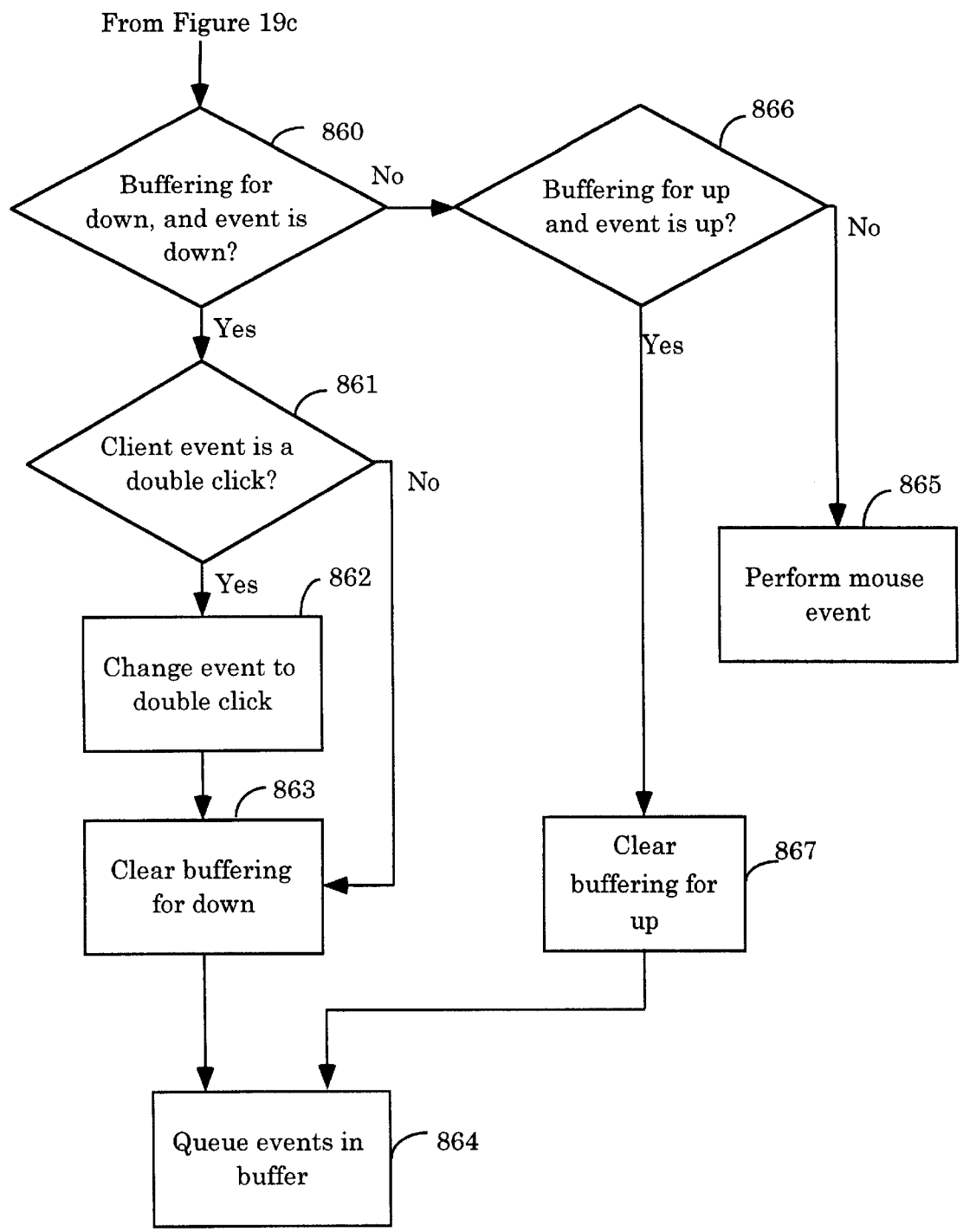

FIG. 18 is a general flow chart illustrating the transmission of mouse capture between a host system and a client system. In step 821, if the host pops up a menu of the shared application, then in step 822, a variable, SetCapture, indicating a mouse "capture" event (i.e. grabbing the mouse), is transmitted to the client system. In step 823, if the client mouse is currently not captured and the menu in a shared application displayed on the host system is captured, then in step 824, the client mouse is captured.

In step 825, if the host exits a menu of the shared application, then a variable, ReleaseCapture indicating a mouse release event is transmitted to the client system. In step 826, if the client mouse is currently captured, then the client mouse is released.

FIG. 19 is a general flow chart illustrating the transmission of mouse events from a client system to a host system. In step 830, a mouse action is performed by the client user on the client system. In step 831, if the mouse action is a button down event, then in step 832 the client mouse is captured. In step 833, if the mouse action is a button up event, then in step 834, the client mouse is released.

In step 835, if the client mouse action is a button event over a shared area, then the mouse event is transmitted to the host system. The mouse event is then stored in the ignored list in the client system. In step 836, if the host system is currently performing operations on applications, then the transmitted client mouse event is added to the buffer in step 837 and the mouse event is queued in the buffer.

In step 840, if the client mouse being transmitted is not buffered, then in steps 840 and 841, if the mouse event is a button event and is over a shared area, the mouse event is buffered. In step 842, if the mouse event transmitted by the client system is a button up event, then the mouse event is buffered in the host system until a button up event is performed. In step 843, if the mouse event is a double click, then the mouse event is buffered until a mouse down event is performed. In step 844, if the host user has a mouse button swapped, then the buttons of the mouse are swapped. In step 845, the mouse events are then stored in the host system queue. In step 846, if the host mouse driver is relative, the relative movement of the host mouse driver is determined and the acceleration is set to zero.

In step 850, if a mouse action for a button up event is buffered and if a mouse up event is performed, then in step 851 a mouse message indicating that an up event is completed is transmitted to the system queue. In step 852, if the current mouse position is at a release position, then in step 854, the release position to be performed is completed. In step 853, if the current mouse position is not at the release position, then the host mouse position is transmitted to the client system.

In step 860, if a mouse button down event is buffered and the current mouse event is down, and in step 861, if the client event is also a double click, then in step 862, the event is changed to a double click mouse event. In step 863, the mouse down event is cleared form the buffer and in step 864, mouse events are queued in the buffer. In step 866, if a mouse up event is buffered and the current mouse event is up, then in step 867, the mouse up event is cleared form the buffer. In step 865, the mouse event is performed.

What has been described is a method and an apparatus for a remote control of a host system by a client system through a task based application sharing method for sharing of one or more applications chosen and made visible within a client chosen rectangle. Unlike the traditional remote control method and the "define a rectangle method" the task based application sharing remote control method of the present invention allows for both the host as well as the client user to share control of the host system and allows sharing of control of one or more applications which the host user has chosen to share. Features of the task based application sharing method of the present invention illustrated include the automatic resizing of remotely shared window feature, automatic detection of children of shared tasks feature, detection of shared area covered by non-shared windows feature, host cursor and client cursor display on client display device feature, dragging the mouse remotely feature, shared fonts feature, and restricting Windows® display driver interface feature.

Certain exemplary embodiments have been described in detail and shown in the accompanying drawings, it is to be understood that such embodiments are merely illustrative of and not restrictive on the broad invention, and that this invention not be limited to the specific arrangements and constructions shown and described, since various other modifications may occur to those ordinarily skilled in the art.

What is claimed is:

1. A method for sharing control of a shared application, the method comprising:

executing one or more unshared applications in a graphic user interface environment on a client system;

displaying the unshared applications on the client system;

receiving a data packet from a host system, the data packet containing information built from a call to the graphic user interface environment on the host system for displaying the shared application, the shared application selected by a host user using the host system;

displaying the shared application in a shared rectangle on the client system based on information contained in the data packet;

displaying a client cursor outside of the shared rectangle and a host cursor inside of the shared rectangle if the client cursor position is outside of the shared rectangle;

displaying only the client cursor inside of the shared rectangle if the client cursor position is inside of the shared rectangle;

accepting client mouse input events on the client system;

determining if the client mouse input events are for the shared application; and transmitting the client mouse input events determined to be for the shared application to the host system for execution as if the host user had made the mouse inputs on the host system.

2. The method of claim 1 further comprising:

receiving a mouse capture indication from the host system if the host system detects a mouse capture event for the shared application;

receiving a mouse release capture indication from the host system if the host system detects a mouse release event for the shared application;

scrolling the shared application in the shared rectangle, if a client cursor is captured, when the client cursor reaches an edge of the shared rectangle;

resizing the shared rectangle, if the client cursor is captured, when the client cursor reaches the edge of the shared rectangle and the shared application in the shared rectangle is fully scrolled in that direction; and restoring the size of the shared rectangle if the client cursor is released.

3. The method of claim 1 further comprising:

receiving a covered portion packet from the host system indicating portions of the shared application that are covered by unshared applications on the host system; and displaying the portions of the shared application on the client system indicated as covered on the host system in a manner readable but different from the portions of the shared application not indicated as covered.

4. A computer program embodied in a computer-readable medium, the computer program including a process for sharing control of a shared application, the computer program comprising instructions for:

executing one or more unshared applications in a graphic user interface environment on a client system;

displaying the unshared applications on the client system;

receiving a data packet from a host system, the data packet containing information built from a call to the graphic user interface environment on the host system for displaying the shared application, the shared application selected by a host user using the host system;

displaying the shared application in a shared rectangle on the client system based on information contained in the data packet;

displaying a client cursor outside of the shared rectangle and a host cursor inside of the shared rectangle if the client cursor position is outside of the shared rectangle;

displaying only the client cursor inside of the shared rectangle if the client cursor position is inside of the shared rectangle;

accepting client mouse input events on the client system;

determining if the client mouse input events are for the shared application; and transmitting the client mouse input events determined to be for the shared application to the host system for execution as if the host user had made the mouse inputs on the host system.

5. The computer program of claim 4 further comprising instructions for:

receiving a mouse capture indication from the host system if the host system detects a mouse capture event for the shared application;

receiving a mouse release capture indication from the host system if the host system detects a mouse release event for the shared application;

scrolling the shared application in the shared rectangle, if a client cursor is captured, when the client cursor reaches an edge of the shared rectangle;

resizing the shared rectangle, if the client cursor is captured, when the client cursor reaches the edge of the shared rectangle and the shared application in the shared rectangle is fully scrolled in that direction; and restoring the size of the shared rectangle if the client cursor is released.

6. The computer program of claim 4 further comprising instructions for:

receiving a covered portion packet from the host system indicating portions of the shared application window that are covered by unshared applications on the host system; and displaying the portions of the shared application window on the client system indicated as covered on the host system in a manner readable but different from the portions of the shared application window not indicated as covered.

7. The computer program of claim 4 wherein the computer-readable media is a computer data signal embodied in a carrier wave.

8. A client computer system for sharing control of a shared application, the client computer system executing instructions comprising:

executing one or more unshared applications in a graphic user interface environment on a client system;

displaying the unshared applications on the client system;

receiving a data packet from a host system, the data packet containing information built from a call to the graphic user interface environment on the host system for displaying the shared application, the shared application selected by a host user using the host system;

displaying the shared application in a shared rectangle on the client system based on information contained in the data packet;

displaying a client cursor outside of the shared rectangle and a host cursor inside of the shared rectangle if the client cursor position is outside of the shared rectangle;

displaying only the client cursor inside of the shared rectangle if the client cursor position is inside of the shared rectangle;

accepting client mouse input events on the client system;

determining if the client mouse input events are for the shared application; and transmitting the client mouse input events determined to be for the shared application to the host system for execution as if the host user had made the mouse inputs on the host system.

9. The client computer system of claim 8 further executing instructions comprising:

receiving a mouse capture indication from the host system if the host system detects a mouse capture event for the shared application;

receiving a mouse release capture indication from the host system if the host system detects a mouse release event for the shared application;

scrolling the shared application in the shared rectangle, if a client cursor is captured, when the client cursor reaches an edge of the shared rectangle;

resizing the shared rectangle, if the client cursor is captured, when the client cursor reaches the edge of the shared rectangle and the shared application in the shared rectangle is fully scrolled in that direction; and restoring the size of the shared rectangle if the client cursor is released.

10. The client computer system of claim 8 further executing instructions comprising:

receiving a covered portion packet from the host system indicating portions of the shared application window that are covered by unshared applications on the host system; and displaying the portions of the shared application window on the client system indicated as covered on the host system in a manner readable but different from the portions of the shared application window not indicated as covered.

11. A method for sharing control of a shared application, the method comprising:

executing one or more unshared applications in a graphic user interface environment on a client system;

displaying the unshared applications on the client system;

receiving a data packet from a host system, the data packet containing information built from a call to the graphic user interface environment on the host system for displaying the shared application, the shared application selected by a host user using the host system;

displaying the shared application in a shared rectangle on the client system based on information contained in the data packet;

accepting client mouse input events on the client system;

determining if the client mouse input events are for the shared application;

transmitting the client mouse input events determined to be for the shared application to the host system for execution as if the host user had made the mouse inputs on the host system;

receiving a mouse capture indication from the host system if the host system detects a mouse capture event for the shared application;

receiving a mouse release capture indication from the host system if the host system detects a mouse release event for the shared application;

scrolling the shared application in the shared rectangle, if a client cursor is captured, when the client cursor reaches an edge of the shared rectangle;

resizing the shared rectangle, if the client cursor is captured, when the client cursor reaches the edge of the shared rectangle and the shared application in the shared rectangle is fully scrolled in that direction; and restoring the size of the shared rectangle if the client cursor is released.

12. The method of claim 11 further comprising:

displaying a client cursor outside of the shared rectangle and a host cursor inside of the shared rectangle if the client cursor position is outside of the shared rectangle; and displaying only the client cursor inside of the shared rectangle if the client cursor position is inside of the shared rectangle.

13. The method of claim 11 further comprising:

receiving a covered portion packet from the host system indicating portions of the shared application that are covered by unshared applications on the host system; and displaying the portions of the shared application on the client system indicated as covered on the host system in a manner readable but different from the portions of the shared application not indicated as covered.

14. A computer program embodied in a computer-readable medium, the computer program including a process for sharing control of a shared application, the computer program comprising instructions for:

executing one or more unshared applications in a graphic user interface environment on a client system;

displaying the unshared applications on the client system;

receiving a data packet from a host system, the data packet containing information built from a call to the graphic user interface environment on the host system for displaying the shared application, the shared application selected by a host user using the host system;

displaying the shared application in a shared rectangle on the client system based on information contained in the data packet;

accepting client mouse input events on the client system;

determining if the client mouse input events are for the shared application;

transmitting the client mouse input events determined to be for the shared application to the host system for execution as if the host user had made the mouse inputs on the host system;

receiving a mouse capture indication from the host system if the host system detects a mouse capture event for the shared application;

receiving a mouse release capture indication from the host system if the host system detects a mouse release event for the shared application;

scrolling the shared application in the shared rectangle, if a client cursor is captured, when the client cursor reaches an edge of the shared rectangle;

resizing the shared rectangle, if the client cursor is captured, when the client cursor reaches the edge of the shared rectangle and the shared application in the shared rectangle is fully scrolled in that direction; and restoring the size of the shared rectangle if the client cursor is released.

15. The computer program of claim 14 further comprising instructions for:

displaying a client cursor outside of the shared rectangle and a host cursor inside of the shared rectangle if the client cursor position is outside of the shared rectangle; and displaying only the client cursor inside of the shared rectangle if the client cursor position is inside of the shared rectangle.

16. The computer program of claim 14 further comprising instructions for:

receiving a covered portion packet from the host system indicating portions of the shared application window that are covered by unshared applications on the host system; and displaying the portions of the shared application window on the client system indicated as covered on the host system in a manner readable but different from the portions of the shared application window not indicated as covered.

17. The computer program of claim 14 wherein the computer-readable media is a computer data signal embodied in a carrier wave.

18. A client computer system for sharing control of a shared application, the client computer system executing instructions comprising:

executing one or more unshared applications in a graphic user interface environment on a client system;

displaying the unshared applications on the client system;

receiving a data packet from a host system, the data packet containing information built from a call to the graphic user interface environment on the host system for displaying the shared application, the shared application selected by a host user using the host system;

displaying the shared application in a shared rectangle on the client system based on information contained in the data packet;

accepting client mouse input events on the client system;

determining if the client mouse input events are for the shared application;

transmitting the client mouse input events determined to be for the shared application to the host system for execution as if the host user had made the mouse inputs on the host system;

receiving a mouse capture indication from the host system if the host system detects a mouse capture event for the shared application;

receiving a mouse release capture indication from the host system if the host system detects a mouse release event for the shared application;

scrolling the shared application in the shared rectangle, if a client cursor is captured, when the client cursor reaches an edge of the shared rectangle;

resizing the shared rectangle, if the client cursor is captured, when the client cursor reaches the edge of the shared rectangle and the shared application in the shared rectangle is fully scrolled in that direction; and restoring the size of the shared rectangle if the client cursor is released.

19. The client computer system of claim 18 further executing instructions comprising:

displaying a client cursor outside of the shared rectangle and a host cursor inside of the shared rectangle if the client cursor position is outside of the shared rectangle; and displaying only the client cursor inside of the shared rectangle if the client cursor position is inside of the shared rectangle.

20. The client computer system of claim 18 further executing instructions comprising:

receiving a covered portion packet from the host system indicating portions of the shared application window that are covered by unshared applications on the host system; and displaying the portions of the shared application window on the client system indicated as covered on the host system in a manner readable but different from the portions of the shared application window not indicated as covered.

* * * * *

UNITED STATES PATENT AND TRADEMARK OFFICE
CERTIFICATE OF CORRECTION

PATENT NO. : 6,329,984 B1
DATED : December 11, 2001
INVENTOR(S) : Boss et al.

It is certified that error appears in the above-identified patent and that said Letters Patent is hereby corrected as shown below:

Column 14,
Line 43, after "Otherwise,", delete "in step,".

Signed and Sealed this

First Day of October, 2002

Attest:

Attesting Officer

JAMES E. ROGAN
Director of the United States Patent and Trademark Office